US010584263B2

(12) United States Patent
Pirrung et al.

(10) Patent No.: US 10,584,263 B2
(45) Date of Patent: Mar. 10, 2020

(54) AQUEOUS POLYMER-SILICON OIL HYBRID COMPOSITION

(71) Applicant: BASF SE, Ludwigshafen (DE)

(72) Inventors: Frank Pirrung, Gruenstadt (DE);
Lothar Engelbrecht, Berlin (DE);
Clemens Auschra, Freiburg (DE);
Jens-Uwe Voigt, Germersheim (DE);
Ralf Knischka, Neustadt (DE)

(73) Assignee: BASF SE, Ludwigshafen (DE)

( * ) Notice: Subject to any disclaimer, the term of this patent is extended or adjusted under 35 U.S.C. 154(b) by 144 days.

(21) Appl. No.: 15/513,462

(22) PCT Filed: Sep. 22, 2015

(86) PCT No.: PCT/EP2015/071705
§ 371 (c)(1),
(2) Date: Mar. 22, 2017

(87) PCT Pub. No.: WO2016/046195
PCT Pub. Date: Mar. 31, 2016

(65) Prior Publication Data
US 2017/0247570 A1    Aug. 31, 2017

(30) Foreign Application Priority Data

Sep. 23, 2014  (EP) .................................. 14185951

(51) Int. Cl.
C09D 183/06      (2006.01)
C08L 33/00       (2006.01)
C08F 2/30        (2006.01)
C08F 2/44        (2006.01)
C08F 2/26        (2006.01)
C08L 83/04       (2006.01)
C09D 11/023      (2014.01)
C09D 11/033      (2014.01)
C09D 11/32       (2014.01)
C09D 11/322      (2014.01)
C09D 11/328      (2014.01)
C09D 183/10      (2006.01)
C09D 183/12      (2006.01)

(52) U.S. Cl.
CPC ............. C09D 183/06 (2013.01); C08F 2/26 (2013.01); C08F 2/30 (2013.01); C08F 2/44 (2013.01); C08L 33/00 (2013.01); C08L 83/04 (2013.01); C09D 11/023 (2013.01); C09D 11/033 (2013.01); C09D 11/32 (2013.01); C09D 11/322 (2013.01); C09D 11/328 (2013.01); C09D 183/10 (2013.01); C09D 183/12 (2013.01)

(58) Field of Classification Search
CPC ................................ C08L 83/04; C08L 33/00
See application file for complete search history.

(56) References Cited

U.S. PATENT DOCUMENTS

| 4,559,162 | A | 12/1985 | Abel et al. | |
| 5,108,654 | A | 4/1992 | Ragaini | |
| 7,674,868 | B2* | 3/2010 | Minge ...................... | C08F 2/22 |
| | | | | 428/405 |
| 7,998,583 | B2* | 8/2011 | Minge ................... | C08F 283/12 |
| | | | | 428/405 |
| 2006/0287416 | A1 | 12/2006 | Schellenberg et al. | |
| 2007/0274941 | A9 | 11/2007 | Blin | |
| 2011/0046294 | A1 | 2/2011 | Minge et al. | |

FOREIGN PATENT DOCUMENTS

| CN | 102533185 A | 7/2012 |
| CN | 102633954 A | 8/2012 |
| CN | 102994017 A | 3/2013 |
| GB | 2 094 330 A | 9/1982 |
| WO | 2008/003601 A1 | 1/2008 |
| WO | 2009/153195 A1 | 12/2009 |

OTHER PUBLICATIONS

Extended European Search Report dated Apr. 7, 2015 in Patent Application No. 14185951.2.
International Preliminary Report on Patentability dated Apr. 6, 2017 in PCT/ EP2015/071705 filed Sep. 22, 2015.
International Search Report and Written Opinion of the International Searching Authority dated Nov. 18, 2015 in PCT/EP2015/071705 filed Sep. 22, 2015.
Markus Antonietti, et al., "Polyreactions in Miniemulsions" Progress in Polymer Science, vol. 27, Issue 4, 2002, pp. 689-757.
H. Auweter, et al., "Fiber-Optical Quasi-Elastic Light Scattering of Concentrated Dispersions" Journal of Colloid and Interface Science, vol. 105, No. 2, Jun. 1985, pp. 399-409.
J. P. Canselier, et al., "Ultrasound Emulsification—An Overview" Journal of Dispersion Science and Technology, vol. 23, Issue 1-3, 2002, pp. 333-349.
D. Lilge, et al., "Diffusion in Concentrated Dispersions: a Study with Fiber-Optic Quasi-Elastic Light Scattering (FOQELS)" Colloid & Polymer Science, vol. 269, No. 7, 1991, pp. 704-712.
T. G. Fox, "Influence of Diluent and of Copolymer Composition on the Glass Temperature of a Polymer System" Bulletin of the American Physical Society, vol. 1, No. 1, Series II, 1956, p. 123 and Cover pages.

(Continued)

Primary Examiner — Vickey Nerangis
(74) Attorney, Agent, or Firm — Oblon, McClelland, Maier & Neustadt, L.L.P.

(57) ABSTRACT

The present invention relates to aqueous polymer-silicon oil hybrid compositions in the form of aqueous dispersions of finely divided polymer-silicon oil hybrid particles which comprise at least one water-insoluble polymer P made of ethylenically unsaturated monomers M, at least one surface-active substance and at least non-polymerizable, non-polar silicon oil. The present invention relates in particular to the use of these compositions as additives in aqueous coating and printing ink compositions.

22 Claims, No Drawings

(56) References Cited

OTHER PUBLICATIONS

H. Wiese, et al., "Single-Mode Fibers in Fiber-Optic Quasielastic Light Scattering: A Study of the Dynamics of Concentrated Latex Dispersions" The Journal of Chemical Physics, vol. 94, Issue 10, 1991, pp. 6429-6443.
International Search Report dated Nov. 18, 2015 in PCT/EP2015/071705 filed Sep. 22, 2015.
U.S. Appl. No. 14/759,821, filed Jul. 8, 2015, US 2015/0337086 A1, Lothar Engelbrecht, et al.
U.S. Appl. No. 14/780,045, filed Sep. 25, 2015, US 2016/0032224 A1, Huiguang Kou, et al.
U.S. Appl. No. 15/039,649, filed May 26, 2016, US 2017/0174803 A1, Frank O. Pirrung, et al.

* cited by examiner

AQUEOUS POLYMER-SILICON OIL HYBRID COMPOSITION

The present invention relates to aqueous polymer-silicon oil hybrid compositions in the form of aqueous dispersions of finely divided polymer-silicon oil hybrid particles which comprise at least one water-insoluble polymer P made of ethylenically unsaturated monomers M, at least one surface-active substance and at least non-polymerizable, non-polar silicon oil. The present invention relates in particular to the use of these compositions as additives in aqueous coating and printing ink compositions.

BACKGROUND OF THE INVENTION

Silicone oils having one or more poly(dimethylsilyloxy)-groups (PDMS-groups) in their polymeric chain are extensively used in the coating and ink industry as additives. The addition level of such additives is typically below 1 wt % of silicon oil based on the total liquid formulation. These additives impart a lower surface tension to the liquid, non-cured formulation. Thereby defects, such as crater formation, fish eyes, substrate dewetting and edge crawling can be reduced or even avoided. Moreover, a better surface flow can be achieved. As silicon-oils having PDMS groups normally tend to accumulate in the air-solid interface, they lead to an improved scratch resistance, anti-blocking behaviour, water repellency and water resistance of the dried coating and in particularly to surface slip of the dry coating film (slip additive).

The incorporation of silicon-oils having one or more PDMS groups into a polar formulation, like a water-based paint or ink, is difficult, in particular if the silicon-oil is rich in dimethylsilyloxy (DMS) groups, especially if the silicone oil is a pure polydimethysiloxane. The incompatibility of the hydrophobic polymer with the aqueous formulation leads to phase separation upon storage and hence to severe cratering of the coating once applied, and to haze after curing of the film.

Pure PDMS, called M-oil, consist of a linear arrangement of dimethylsilyloxy-groups, terminated on both ends by trimetylsilyloxy groups or Si-bound hydroxyl groups. M-oils are clear, colorless liquids at room temperature. They are characterized by the average number of repeating DMS units, by their molecular weight $M_w$, or by their viscosity, which depends on the lengths of the PDMS chain. These silicone oils are commercially available commodities.

The state of the art shows two technical solutions for including PDMS rich silicone oils, i.e. silicon-oil is rich in dimethylsilyloxy (DMS) group, as additives for aqueous systems:

(1) Providing an aqueous emulsion of the silicone oil. Typically large amounts of a nonionic or ionic surfactant are needed to prepare a physically stable aqueous emulsion of the silicon, the amount being up to 30 wt % of surfactant based on the silicone oil. Such emulsions can be stirred into the aqueous systems by applying low shear forces. However, a large amount of surfactant is thereby introduced into the formulation. This large amount of surfactants is known to lead to disadvantages like foaming problems, water sensitivity of the cured film, as well as surfactant migration, resulting smeary films, haze and fogging phenomena.

(2) Chemically modifying the PDMS rich silicone oil by introducing polar (and thus water compatible) polymer chains into the poly(dimethylsilyloxy) backbone. This route has a high complexity, as reactive sites, such as Si—H or Si—Cl groups, need to be introduced into the main poly(dimethylsilyloxy) chain, e.g. to the terminus (alpha-omega-silicones, block structures) or along the PDMS chains (comb structures), or combinations of the two. These reactive sites are then used for the chemical attachment of a water compatible, polar polymer, typically a polymer of ethylene oxide and/or propylene oxide repeating units. The chemical attachment is achieved via a condensation using OH-functionalities of the polar polymer, or addition reactions via Pt-catalysed hydrosilylation using an alpha-olefin functionality of the polar polymer. Thereby the resulting PDMS block or comb copolymers are rendered water dispersible or water soluble depending on the weight ratio and polarity of the introduced polar polymers. However, this simultaneously leads to a dilution of the surface active PDMS units in the formed polymer. Moreover, the surfactant character of the block or comb copolymer is strongly increased, helping the accumulation at the film-air interface on one side, but adding strongly to the foam and water sensitivity problems as in the case of PDMS emulsions.

WO 2009153195 (Wacker Chemie) discloses nanoparticulate silicone organo copolymers in the form of aqueous polymer dispersions or polymer powders that can be redispersed in water where the copolymers are obtained by radically-initiated copolymerization in an aqueous medium, of one or more conventional monomers, such as vinyl esters, olefins and (meth)acrylic acid esters, with special linear mono(meth)-acrylate-functionalized poly(dimethylsiloxane), in the presence of at least one particle material being functionalized with ethylenically unsaturated, radically polymerizable groups. The material should provide coatings having excellent resistance e.g. against water weather impacts, attack by chemical agents and UV radiation; and low fouling tendency. However, the preparation of mono (meth)acrylate-functionalized poly(dimethylsiloxanes) is costly. As the PDMS groups are chemically attached to the inert polymer their effectiveness as surface additive in polar coating formulations is low.

SUMMARY OF THE INVENTION

It is an object of this invention to provide water-based product forms of readily available non-polar silicone oils, without the need for preparing a surfactant-rich emulsion or a chemical modification of the PDMS backbone of nonpolar polysiloxanes.

It was surprisingly found, that aqueous dispersions of finely divided polymer-silicon oil hybrid particles which comprise at least one water-insoluble polymer P made of ethylenically unsaturated monomers M and at least non-polymerizable, non-polar silicon oil having at least one poly(dimethylsilyloxy)-group show good application effects as surface additive in polar coating formulations, even at low dosage level. Despite the fact that these silicone-acrylate hybrid additives are neither chemically modified with polar groups nor contain high amounts of low molecular weight surfactants, these polymer-silicon oil hybrid particles can be easily incorporated to polar coating systems, without showing the incompatibility problems known from conventional emulsions of nonpolar silicone oils. Without being bound to any theory, it is believed that the encapsulated non-polar silicone additives well disperse as stable particles in water-borne formulations. During and/or after film formation, the non-polar silicone is able to migrate out of the capsules and provide very useful effect as a surface additive.

The aqueous dispersions of finely divided polymer-silicon oil hybrid particles can be easily prepared by emulsion polymerization, in particular by miniemulsion polymerization process, of non-polar ethylenically unsaturated monomers in presence of the non-polymerizable, non-polar silicon oil having at least one poly(dimethylsilyloxy)-group. The resulting aqueous polymer-silicon oil hybrid composition is composed of small stable polymer particles, containing the nonpolar silicone oil.

Therefore, the present invention relates to aqueous polymer-silicon oil hybrid compositions in the form of an aqueous dispersions of finely divided polymer-silicon oil hybrid particles which comprise at least one water-insoluble polymer P made of ethylenically unsaturated monomers M, at least one surface-active substance and at least non-polymerizable, non-polar silicon oil having at least one poly(dimethylsilyloxy)-group, wherein the silicon oil is present in the polymer particles in an amount of 0.15 to 2 parts by weight, per 1 part by weight of polymer P, where the monomers M comprise at least 90% by weight, in particular at least 95% by weight of at least one monoethylenically unsaturated monomer M1 having a water-solubility of at most 50 g/L at 20° C.

The aqueous polymer-silicon oil hybrid compositions of the present invention can be easily incorporated into polar coating or printing systems such as aqueous coating compositions and aqueous printing ink compositions, including water-based paints and water-based inks. Even at low concentrations, they provide good application properties such as
- reduction of the static or dynamic friction of the coating or print;
- increasing the anti-blocking properties of the coating or print;
- increasing stain resistance of the coating or print;
- imparting anti-graffity properties to a coating or print; and
- imparting hydrophobic properties or water-repellency to the coating or print.

Therefore, the present invention also relates to the use of the aqueous polymer-silicon oil hybrid compositions of the present invention as an additive for polymer based aqueous coating or printing ink compositions, such as water-borne coatings and water-borne inks.

The present invention also relates to aqueous coating composition comprising at least one binder polymer P' in the form of finely dispersed polymer particles and at least one aqueous polymer-silicon oil hybrid composition as defined herein.

The present invention also relates to aqueous printing ink composition comprising at least one binder polymer P' in the form of finely dispersed polymer particles and at least one aqueous polymer-silicon oil hybrid composition as defined herein.

The invention also relates to a process for preparing an aqueous polymer-silicon oil hybrid composition of any of the preceding claims, which comprises polymerizing an aqueous oil-in water emulsion, hereinafter O/W-emulsion, by a radical emulsion polymerization in the presence of at least one surfactant, wherein the oil phase of the O/W-emulsion is a solution of the non-polymerizable, non-polar silicon oil in the ethylenically unsaturated monomers M forming the polymer P, the concentration of the non-polymerizable silicon oil being at least 15%, by weight, based on the amount of monomer M.

DETAILED DESCRIPTION OF THE INVENTION

The term "monoethylenically unsaturated" used here and below means that the respective monomer has one polymerizable C=C double bond, more particularly one C=C double bond polymerizable under the conditions of a free-radical aqueous emulsion polymerization.

The prefixes $C_n$-$C_m$ used here and below specify a range for the possible number of carbon atoms in each case that may be present in a radical or molecule thus identified or a compound designated therewith.

Thus, for example, $C_1$-$C_{24}$ alkyl, or $C_1$-$C_{10}$ alkyl or $C_1$-$C_4$ alkyl, stands for a linear or branched saturated alkyl radical having 1 to 24, or 1 to 10 or 1 to 4, C atoms.

Thus, for example, $C_5$-$C_8$ alkanol stands for a monovalent cycloaliphatic alcohol having 5 to 8 C atoms such as, for example, cyclopentanol, cyclohexanol, cycloheptanol, methylcyclohexanol or cyclooctanol.

Thus, for example, phenyl-$C_1$-$C_4$ alkanol or phenoxy-$C_1$-$C_4$ alkanol stand for a phenyl- or phenoxy-substituted monovalent alkanol, respectively, the alkanol moiety having 1 to 4 C atoms. Examples of phenyl-$C_1$-$C_4$ alkanol are benzyl alcohol, 1-phenylethanol and 2-phenylethanol. An example of phenoxy-$C_1$-$C_4$ alkanol is 2-phenoxyethanol.

$C_1$-$C_{20}$-Alkyl phenyl stands for a phenyl radical, which is substituted by a $C_1$-$C_{20}$-alkyl radical as defined above.

Monoethylenically unsaturated $C_3$-$C_6$ monocarboxylic acids stands for a monoethylenically unsaturated monocarboxylic acid having 3 to 6 C atoms, such as acrylic acid, methacrylic acid, vinylacetic acid or crotonic acid, for example.

Monoethylenically unsaturated $C_4$-$C_6$ dicarboxylic acids stands for a monoethylenically unsaturated dicarboxylic acid having 4 to 6 C atoms, such as maleic, fumaric, itaconic or citraconic acid, for example.

The polymer P of the aqueous polymer-silicon oil hybrid composition is formed from one or more monomers M, which comprise at least 90% by weight, in particular at least 95% by weight of at least one monoethylenically unsaturated monomer M1 having a water-solubility of at most 50 g/l at 20° C. in particular of at most 30 g/l, at 20° C. The solubilities of monomers generally relate to solubilities at a pressure of 101.325 hPa and a pH of 7.

Examples of suitable monoethylenically unsaturated monomers M1 include but are not limited to:
- esters of monoethylenically unsaturated $C_3$-$C_6$ monocarboxylic acids with $C_1$-$C_{30}$ alkanols, $C_1$-$C_{20}$-alkyl phenols, $C_5$-$C_{20}$ cycloalkanols, phenyl-$C_1$-$C_4$ alkanols or phenoxy-$C_1$-$C_4$ alkanols, where the phenyl ring in phenyl-$C_1$-$C_4$ alkanols or phenoxy-$C_1$-$C_4$ alkanols may be unsubstituted or substituted by a $C_1$-$C_{20}$-alkyl radical, more particularly the aforementioned esters of acrylic acid and also the aforementioned esters of methacrylic acid;
- diesters of monoethylenically unsaturated $C_3$-$C_6$ dicarboxylic acids with $C_3$-$C_6$ alkanols, $C_1$-$C_{20}$-alkyl phenols, $C_5$-$C_{20}$ cycloalkanols, phenyl-$C_1$-$C_4$ alkanols or phenoxy-$C_1$-$C_4$ alkanols, where the phenyl ring in phenyl-$C_1$-$C_4$ alkanols or phenoxy-$C_1$-$C_4$ alkanols may be unsubstituted or substituted by a $C_1$-$C_{20}$-alkyl radical, more particularly the aforementioned esters of maleic acid;
- vinylaromatic hydrocarbons, such as, for example, styrene, vinyltoluenes, tert-butylstyrene, α-methylstyrene, and the like, more particularly styrene;
- vinyl, allyl, and methallyl esters of saturated aliphatic $C_2$-$C_{24}$ monocarboxylic acids; and
- α-olefins having 2 to 24 C atoms, and also conjugated diolefins such as butadiene and isoprene.

Examples of esters of monoethylenically unsaturated $C_3$-$C_6$ monocarboxylic acids with $C_1$-$C_{30}$ alkanols, $C_1$-$C_{20}$- alkyl phenols, $C_5$-$C_{20}$ cycloalkanols, phenyl-$C_1$-$C_4$ alkanols or phenoxy-$C_1$-$C_4$ alkanols are, in particular, the esters of acrylic acid such as methyl acrylate, ethyl acrylate, n-propyl acrylate, isopropyl acrylate, n-butyl acrylate, 2-butyl acrylate, isobutyl acrylate, tert-butyl acrylate, n-hexyl acrylate, 2-ethylhexyl acrylate, 3-propylheptyl acrylate, decyl acrylate, lauryl acrylate, stearyl acrylate, cyclohexyl acrylate, benzyl acrylate, 2-phenylethyl acrylate, 1-phenylethyl acrylate, 2-phenoxyethyl acrylate, and also the esters of methacrylic acid such as methyl methacrylate, ethyl methacrylate, n-propyl methacrylate, isopropyl methacrylate, n-butyl methacrylate, 2-butyl methacrylate, isobutyl methacrylate, tert-butyl methacrylate, n-hexyl methacrylate, 2-ethylhexyl methacrylate, decyl methacrylate, lauryl methacrylate, stearyl methacrylate, cyclohexyl methacrylate, benzyl methacrylate, 2-phenylethyl methacrylate, 1-phenylethyl methacrylate, and 2-phenoxyethyl methacrylate.

Examples of diesters of monoethylenically unsaturated $C_4$-$C_6$ dicarboxylic acids with $C_1$-$C_{30}$ alkanols, $C_1$-$C_{20}$-alkyl phenols, $C_5$-$C_{20}$ cycloalkanols, phenyl-$C_1$-$C_4$ alkanols or phenoxy-$C_1$-$C_4$ alkanols are, in particular, the diesters of maleic acid and the diesters of fumaric acid, more particularly di-$C_1$-$C_{20}$ alkyl maleinates and di-$C_1$-$C_{20}$ alkyl fumarates such as dimethyl maleinate, diethyl maleinate, di-n-butyl maleinate, dimethyl fumarate, diethyl fumarate, and di-n-butyl fumarate.

Examples of vinyl, allyl, and methallyl esters of saturated aliphatic $C_2$-$C_{24}$ monocarboxylic acids are vinyl acetate, vinyl propionate, vinyl butyrate, vinyl pivalate, vinyl hexanoate, vinyl-2-ethylhexanoate, vinyl laurate, and vinyl stearate, and also the corresponding allyl and methallyl esters.

Examples of α-olefins having 2 to 24 C atoms are ethylene, propylene, 1-butene, isobutene, 1-pentene, 1-hexene, diisobutene, triisobuten, tetraisobutene, pentaisobutene and the like.

Preferably, the monomers M comprise one or more monomers M1a which are selected from the group consisting of esters of monoethylenically unsaturated $C_3$-$C_6$ monocarboxylic acids with $C_1$-$C_{10}$ alkanols, $C_5$-$C_8$ cycloalkanols, phenyl-$C_1$-$C_2$ alkanols or phenoxy-$C_1$-$C_2$alkanols, the diesters of monoethylenically unsaturated $C_4$-$C_6$ dicarboxylic acids with $C_1$-$C_{10}$ alkanols, $C_5$-$C_8$ cycloalkanols, phenyl-$C_1$-$C_4$ alkanols or phenoxy-$C_1$-$C_4$-alkanols, vinylaromatic hydrocarbons having from 6 to 10 carbon atoms, the mixtures of these monomers.

Among the monomers M1a, the esters of monoethylenically unsaturated $C_3$-$C_6$ monocarboxylic acids, more particularly the esters of acrylic acid or of methacrylic acid, with $C_1$-$C_{10}$ alkanols, and diesters of monoethylenically unsaturated $C_4$-$C_6$ dicarboxylic acids with $C_1$-$C_{10}$ alkanols, and vinylaromatic hydrocarbons, especially styrene, are preferred.

Among the monomers M1a, the esters of monoethylenically unsaturated $C_3$-$C_6$ monocarboxylic acids, more particularly the esters of acrylic acid or of methacrylic acid, with $C_1$-$C_{10}$ alkanols, and vinylaromatic hydrocarbons, especially styrene, are particularly preferred.

Among the monomers M1a, the esters of acrylic acid with $C_2$-$C_{10}$ alkanols (=$C_2$-$C_{10}$ alkyl acrylates), the esters of methacrylic acid with $C_1$-$C_{10}$ alkanols (=$C_1$-$C_{10}$ alkyl methacrylates), and vinylaromatic hydrocarbons, especially styrene, are very particularly preferred.

In particularly preferred embodiments of the invention the monomers M1a are selected from $C_1$-$C_4$ alkyl methacrylates, $C_2$-$C_{10}$ alkyl acrylates, mixtures of at least one $C_1$-$C_4$-alkyl methacrylate with styrene, mixtures of styrene with one or more $C_2$-$C_{10}$ alkyl acrylates, mixtures of at least one $C_1$-$C_4$ alkyl methacrylate with at least one $C_2$-$C_{10}$ alkyl acrylate, and mixtures of at least one $C_1$-$C_4$ alkyl methacrylate with styrene and at least one $C_2$-$C_{10}$ alkyl acrylate.

In very particularly preferred embodiments of the invention the monomers M1a are selected from $C_1$-$C_4$ alkyl methacrylates, especially methyl methacrylate, mixtures of $C_1$-$C_4$ alkyl methacrylates, in particular methyl methacrylatem with styrene, mixtures of $C_1$-$C_4$ alkyl methacrylates, especially methyl methacrylate, with $C_2$-$C_{10}$ alkyl acrylates, and mixtures of $C_1$-$C_4$ alkyl methacrylates, especially methyl methacrylate, with styrene and $C_2$-$C_{10}$ alkyl acrylates, with the fraction of $C_1$-$C_4$ alkyl methacrylates, especially methyl methacrylate, based on the total amount of the monomers M1a, being at least 50% by weight.

In one particular embodiment of the invention the monomers M1a are the sole monomers M1.

In another embodiment, the monomers M1 comprise a mixture of at least one monomer M1a as defined above, in particular at least one monomer M1a of the preferred, particularly preferred or very particularly preferred embodiments of the invention, and at least one monoethylenically unsaturated monomer M1b which have at least one saturated $C_{11}$-$C_{30}$ hydrocarbon radical or a $C_4$-$C_{20}$-alkyl phenyl radical.

Suitable monomers M1b include but are not limited to:
esters of monoethylenically unsaturated $C_3$-$C_6$ monocarboxylic acids with $C_{11}$-$C_{30}$ alkanols, $C_4$-$C_{20}$-alkyl phenols or $C_{11}$-$C_{20}$ cycloalkanols, more particularly the aforementioned esters of acrylic acid and also the aforementioned esters of methacrylic acid;
diesters of monoethylenically unsaturated $C_4$-$C_6$ dicarboxylic with $C_{11}$-$C_{30}$ alkanols, $C_4$-$C_{20}$-alkyl phenols or $C_{11}$-$C_{20}$ cycloalkanols, more particularly the aforementioned esters of maleic acid;
$C_4$-$C_{20}$-alkyl substituted styrene, such as tert-butylstyrene;
vinyl, allyl, and methallyl esters of saturated aliphatic $C_{12}$-$C_{24}$ monocarboxylic acids; and
α-olefins having 12 to 24 C atoms.

Preferred monomers M1b are selected from the esters of monoethylenically unsaturated $C_3$-$C_6$ monocarboxylic acids with $C_{11}$-$C_{30}$ alkanols, in particular from the esters of monoethylenically unsaturated $C_3$-$C_6$ monocarboxylic acids with $C_{11}$-$C_{24}$ alkanols, and mixtures thereof. Particularly preferred monomers M1b are selected from $C_{11}$-$C_{24}$ alkyl acrylates, such as dodecyl acrylate, tetradecyl acrylate, hexadecyl acrylate, octadecyl acrylate (=stearyl acrylate), mixtures thereof and $C_{11}$-$C_{24}$ alkyl methacrylates, such as dodecyl methacrylate, tetradecyl methacrylate, hexadecyl methacrylate, octadecyl methacrylate (=stearyl methacrylate), and mixtures thereof.

Preferably, the monomers M forming the polymer P comprise at least 70% by weight, in particular at least 80% by weight, especially at least 80% by weight, based on the total amount of the constituent monomers M of the polymer P, of one or more monomers M1a as defined above, in particular at least one monomer M1a of the preferred, particularly preferred or very particularly preferred embodiments of the invention, and optionally up to 30% by weight, in particular not more than 20% by weight, especially not more than 10% by weight, based on the total amount of the constituent monomers M of the polymer P, of one or more monomers M1b.

If the monomers M1 comprise a mixture of at least one monomer M1a as defined above, in particular at least one monomer M1a of the preferred, particularly preferred or very particularly preferred embodiments of the invention, and at least one monoethylenically unsaturated monomer M1b, the amount of monomer M1a is e.g. from 80 to 99.9% by weight, in particular from 90 to 99.5% by weight while the amount of one or more monoethylenically unsaturated monomers M1b, is e.g. from 0.1 to 20% by weight, in particular from 0.5 to 10% by weight, based on the total amount of monomers M.

Preferably, the monomers M forming the polymer P comprise from 80 to 99.9% by weight, in particular from 90 to 99.5% by weight, based on the total amount of the constituent monomers M of the polymer P, of one or more monomers M1a as defined above, in particular at least one monomer M1a of the preferred, particularly preferred or very particularly preferred embodiments of the invention, and 0.1% to 20% by weight, in particular 0.5 to 10% by weight, based on the total amount of monomers M, of at least one ethylenically unsaturated monomer different from the monomers M1a.

Suitable monomers different from monomers M1a include
- the aforementioned monomers M1b, preferably in the amounts given above; and
- ethylenically unsaturated monomers M2, which are different from monomers M1a and M1b.

The amount of monomers M2 will generally not exceed 10% by weight and, if present will frequently be from 0.1% to 10% by weight, based on the total amount of monomers M.

Suitable monomers M2 include, but are not limited to,
- monomers M2a which has at least two non-conjugated ethylenically unsaturated double bonds;
- monoethylenically unsaturated monomers M2b having at least acidic group, e.g. monoethylenically unsaturated carboxylic acids, monoethylenically unsaturated sulfonic acids, monoethylenically unsaturated phosphonic acids, monoethylenically unsaturated phosphoric monoesters, and also the salts thereof, including the salts thereof; and
- monoethylenically unsaturated neutral monomers M2c having a solubility in water at 25° C. of at least 100 g/l;

The amount of monomers M2a will generally not exceed 5% by weight and, if present will frequently be from 0.01% to 5% by weight, in particular from 0.02 to 3%, especially 0.02 to 1% by weight based on the total amount of monomers M.

The amount of monomers M2b will generally not exceed 10% by weight and, if present will frequently be from 0.1% to 10% by weight, in particular from 0.2 to 5% by weight, especially 0.2 to 3% by weight, based on the total amount of monomers M.

The amount of monomers M2c will generally not exceed 10% by weight and, if present, will frequently be from 0.1% to 10% by weight, in particular from 0.1 to 5% by weight based on the total amount of monomers M.

In a preferred embodiment, the monomers M comprise 0.1% to 10% by weight, in particular from 0.2 to 5% by weight, especially 0.2 to 3% by weight, based on the total amount of the monomers M, of at least one monomer selected from monoethylenically unsaturated monomers M2b and monoethylenically unsaturated neutral monomers M2c.

Examples of monomers M2a are as follows:
- esters of monohydric, unsaturated alcohols such as allyl alcohol, 1-buten-3-ol, 5-hexen-1-ol, 1-octen-3-ol, 9-decen-1-ol, dicyclopentenyl alcohol, 10-undecen-1-ol, cinnamyl alcohol, citronellol, crotyl alcohol or cis-9-octadecen-1-ol with one of the aforementioned monoethylenically unsaturated $C_3$-$C_8$ monocarboxylic acids, more particularly the esters of acrylic acid or of methacrylic acid, especially the allyl esters such as allyl acrylate and allyl methacrylate,
- di-, tri-, and tetra-esters of the aforementioned monoethylenically unsaturated $C_3$-$C_8$ monocarboxylic acids, more particularly the di-, tri-, and tetra-esters of acrylic acid or of methacrylic acid, with aliphatic or cycloaliphatic diols or polyols, more particularly the diesters of acrylic acid or of methacrylic acid with dihydric alcohols, examples being alkanols, such as 1,2-propanediol, 1,3-propanediol, 1,2-butanediol, 1,3-butanediol, 2,3-butanediol, 1,4-butanediol, but-2-ene-1,4-diol, 1,2-pentanediol, 1,5-pentanediol, 1,2-hexanediol, 1,6-hexanediol, 1,10-decanediol, 1,2-dodecanediol, 1,12-dodecanediol, neopentyl glycol, 3-methylpentane-1,5-diol, 2,5-dimethyl-1,3-hexanediol, 2,2,4-trimethyl-1,3-pentanediol, 1,2-cyclohexanediol, 1,4-cyclohexanediol, 1,4-bis(hydroxymethyl)-cyclohexane, the mono-neopentylglycol ester of hydroxypivalic acid, 2,2-bis(4-hydroxyphenyl)propane, 2,2-bis[4-(2-hydroxypropyl)phenyl]propane, diethylene glycol, triethylene glycol, tetraethylene glycol, dipropylene glycol, tripropylene glycol, tetrapropylene glycol, 3-thiapentane-1,5-diol, polyethylene glycols, polypropylene glycols or polytetrahydrofurans having molecular weights of in each case 200 to 10 000, and also the di-, tri-, and tetra-esters of acrylic acid or of methacrylic acid with polyhydric polyols such as trimethylolpropane, glycerol, pentaerythritol, 1,2,5-pentanetriol, 1,2,6-hexanetriol, cyanuric acid, sorbitans, sucrose, glucose or mannose;
- diesters of the aforementioned monohydric, unsaturated alcohols, more particularly of allyl alcohol with dibasic carboxylic acids such as malonic acid, tartaric acid, trimellitic acid, phthalic acid, terephthalic acid, citric acid or succinic acid;
- linear, branched or cyclic, aliphatic or aromatic hydrocarbons which possess at least two ethylenically unsaturated double bonds, which in the case of aliphatic hydrocarbons must not be conjugated, e.g., divinylbenzene, divinyltoluene, 1,7-octadiene, 1,9-decadiene, 4-vinyl-1-cyclohexene or trivinylcyclohexane;
- acrylamides, methacrylamides, and N-allylamines of at least difunctional amines. Such amines are, for example, 1,2-diaminoethane, 1,3-diaminopropane, 1,4-diaminobutane, 1,6-diaminohexane, 1,12-dodecanediamine, piperazine, diethylenetriamine or isophoronediamine; and
- N,N'-divinyl compounds of urea derivatives, at least difunctional amides, cyanurates or urethanes, as for example of urea, ethyleneurea, propyleneurea or tartaramide, e.g., N,N'-divinylethyleneurea or N,N'-divinylpropyleneurea.

Among the monomers M2a, the esters of monohydric, unsaturated alcohols with one of the aforementioned monoethylenically unsaturated $C_3$-$C_8$ monocarboxylic acids, more particularly the esters of acrylic acid or of methacrylic acid, especially the allyl esters such as allyl acrylate and allyl methacrylate, and also the diesters of monoethylenically unsaturated $C_3$-$C_8$ monocarboxylic acids, more particularly the diesters of acrylic acid or of methacrylic acid, with dihydric alcohols, especially with $C_3$-$C_{10}$ alkanediols such as 1,2-propanediol, 1,3-propanediol, 1,2-butanediol, 1,3-butanediol, 2,3-butanediol, 1,4-butanediol, but-2-ene-1, 4-diol, 1,2-pentanediol, 1,5-pentanediol, 1,2-hexanediol, 1,6-hexanediol, 1,10-decanediol, or with oligoalkylene glycols such as diethylene glycol, triethylene glycol, tetraethylene glycol, dipropylene glycol, tripropylene glycol or tetrapropylene glycol, are preferred. Among the monomers M2a, the allyl esters of monoethylenically unsaturated $C_3$-$C_8$ monocarboxylic acids such as allyl acrylate and allyl methacrylate, and also the diesters of acrylic acid or of methacrylic acid with $C_3$-$C_{10}$ alkanediols, such as 1,4-butanediol diacrylate or 1,6-hexanediol diacrylate, and the diesters of acrylic acid or of methacrylic acid with diethylene glycol, triethylene glycol or tetraethylene glycol, are particularly preferred.

Examples of monomers M2b are as follows:
monoethylenically unsaturated $C_3$-$C_8$ monocarboxylic and $C_4$-$C_8$ dicarboxylic acids, for example, acrylic acid, methacrylic acid, crotonic acid, maleic acid, fumaric acid or itaconic acid.
monoethylenically unsaturated sulfonic acids in which the sulfonic acid group is attached to an aliphatic hydrocarbon radical, and salts thereof, such as vinylsulfonic acid, allylsulfonic acid, methallylsulfonic acid, 2-acrylamido-2-methylpropanesulfonic acid, 2-methacrylamido-2-methylpropanesulfonic acid, 2-acrylamidoethanesulfonic acid, 2-methacrylamidoethanesulfonic acid, 2-acryloyloxyethanesulfonic acid, 2-methacryloyloxyethanesulfonic acid, 3-acryloyloxypropanesulfonic acid and 2-methacryloyloxypropanesulfonic acid, and salts thereof,
vinylaromatic sulfonic acids, i.e., monoethylenically unsaturated sulfonic acids in which the sulfonic acid group is attached to an aromatic hydrocarbon radical, more particularly to a phenyl ring, and salts thereof, such as, for example, styrenesulfonic acids such as 2-, 3- or 4-vinylbenzenesulfonic acid and salts thereof,
monoethylenically unsaturated phosphonic acids in which the phosphonic acid group is attached to an aliphatic hydrocarbon radical, and salts thereof, such as vinylphosphonic acid, 2-acrylamido-2-methylpropanephosphonic acid, 2-methacrylamido-2-methylpropanephosphonic acid, 2-acrylamidoethanephosphonic acid, 2-methacrylamidoethanephosphonic acid, 2-acryloyloxyethanephosphonic acid, 2-methacryloyloxyethanephosphonic acid, 3-acryloyloxypropanephosphonic acid and 2-methacryloyloxypropanephosphonic acid, and salts thereof,
monoethylenically unsaturated phosphoric monoesters, more particularly the monoesters of phosphoric acid with hydroxy-$C_2$-$C_4$ alkyl acrylates and hydroxy-$C_2$-$C_4$ alkyl methacrylates, such as, for example, 2-acryloyloxyethyl phosphate, 2-methacryloyloxyethyl phosphate, 3-acryloyloxypropyl phosphate, 3-methacryloyloxypropyl phosphate, 4-acryloyloxybutyl phosphate and 4-methacryloyloxybutyl phosphate, and salts thereof.

Where the monomers M2b are present in their salt form, they have a corresponding cation as counterion. Examples of suitable cations are alkali metal cations such as $Na^+$ or $K^+$, alkaline earth metal ions such as the $Ca^{2+}$ and $Mg^{2+}$, and also ammonium ions such as $NH_4^+$, tetraalkylammonium cations such as tetramethylammonium, tetraethylammonium, and tetrabutylammonium, and also protonated primary, secondary and tertiary amines, more particularly those which carry 1, 2 or 3 radicals selected from $C_1$-$C_{20}$ alkyl groups and hydroxyethyl groups, e.g., the protonated forms of mono-, di-, and tributylamine, propylamine, diisopropylamine, hexylamine, dodecylamine, oleylamine, stearylamine, ethoxylated oleylamine, ethoxylated stearylamine, ethanolamine, diethanolamine, triethanolamine or of N,N-dimethylethanolamine. Preference is given to the alkali metal salts.

Among the monomers M2b, the monoethylenically unsaturated $C_3$-$C_8$ monocarboxylic acids, especially acrylic acid and methacrylic acid and mixtures thereof, are particularly preferred.

Examples of monomers M2c are as follows:
the amides of the aforementioned monoethylenically unsaturated $C_3$-$C_8$ monocarboxylic acids, more particularly acrylamide and methacrylamide,
hydroxyalkyl esters of the aforementioned monoethylenically unsaturated $C_3$-$C_8$ monocarboxylic acids, e.g., hydroxyethyl acrylate, hydroxyethyl methacrylate, 2- and 3-hydroxypropyl acrylate, 2- and 3-hydroxypropyl methacrylate,
monoesters of the aforementioned monoethylenically unsaturated $C_3$-$C_8$ monocarboxylic and $C_4$-$C_8$-dicarboxylic acids with $C_2$-$C_4$ polyalkylene glycols, more particularly the esters of these carboxylic acids with polyethylene glycol or with alkyl-polyethylene glycols, the (alkyl)polyethylene glycol radical typically having a molecular weight in the range from 100 to 3000;
monoethylenically unsaturated monomers having an urea group, where the urea group may be part of a saturated heterocyclic ring, such as an imidazolinone ring, examples including N-acryloxyethylimidazolin-2-one and N-methacryloxyethylimidazolin-2-one; and
N-vinyl amides of aliphatic $C_1$-$C_{10}$ carboxylic acids, and N-vinyl lactams, such as N-vinylformamide, N-vinylacetamide, N-vinylpyrrolidone, and N-vinylcaprolactam.

Preferred monomers M2c are the amides of the aforementioned monoethylenically unsaturated $C_3$-$C_8$ monocarboxylic acids, more particularly acrylamide and methacrylamide, and the hydroxyalkyl esters of the aforementioned monoethylenically unsaturated $C_3$-$C_8$ monocarboxylic acids, e.g., hydroxyethyl acrylate, hydroxyethyl methacrylate, 2- and 3-hydroxypropyl acrylate, 2- and 3-hydroxypropyl methacrylate.

In one particularly preferred embodiment of the invention the constituent monomers M of the polymer P comprise:
80% to 99.79% by weight, more particularly 85% to 98.75% by weight, and especially 90% to 99.5% by weight, of at least one monomer M1a, which are in particular selected from the group consisting of the esters of monoethylenically unsaturated $C_3$-$C_6$ monocarboxylic acids with $C_1$-$C_{10}$ alkanols, vinylaromatic hydrocarbons, and the mixtures of these monomers;
0.1% to 10% by weight, more particularly 0.1% to 5% by weight, and especially 0.2% to 3% by weight, by weight, of at least one monoethylenically unsaturated monomer M2b, more particularly acrylic acid or methacrylic acid, or the salts thereof, the figures in % by weight being based on the free acid; and
optionally one or more further monomers, selected from
0.1% to 19.89% by weight, more particularly 1% to 14.88% by weight, and especially 1% to 9.78%, by weight, of one or more monomers M1b, which are preferably selected from the esters of monoethylenically unsaturated $C_3$-$C_6$ monocarboxylic acids with $C_{11}$-$C_{30}$ alkanols, in particular from the esters of monoethylenically unsaturated $C_3$-$C_6$ monocarboxylic acids with $C_{11}$-$C_{24}$ alkanols, and mixtures thereof with particularly preference given to $C_{11}$-$C_{24}$ alkyl acrylates and $C_{11}$-$C_{24}$ alkyl methacrylates and mixtures thereof;
0.01% to 5% by weight, more particularly 0.02% to 3% by weight, and especially 0.02% to 1% by weight, of one or more monoethylenically unsaturated monomer M2a, more particularly one of the preferred monomers M2a as defined above, especially selected from diesters of acrylic acid or of methacrylic acid with $C_3$-$C_{10}$ alkanediols, such as 1,4-butanediol diacrylate or 1,6-hexanediol diacrylate, and the diesters of acrylic acid or of methacrylic acid with diethylene glycol, triethylene glycol or tetraethylene glycol;

all figures in % by weight being based on the total weight of the constituent monomers M of the polymer.

The glass transition temperature $T_g$ of the polymer P, determined by means of dynamic scanning calorimetry (DSC) in accordance with ASTM-D 3418:2012, is not of particular importance and may be e.g. as low as $-60°$ C. or e.g. as high as $150°$ C. Amongst the compositions of the present invention particular embodiment relates to those compositions, where the polymer P has a glass transition temperature $T_g$ of at least $0°$ C., in particular at least $10°$ C. and especially at least $20°$ C. In particular the glass transition temperature will not exceed $130°$ C., in particular $110°$ C. The glass transition temperature of the polymer P can be controlled by the monomer composition in a known manner.

By the glass transition temperature $T_g$ here is meant the temperature at the inflection point ("midpoint temperature") determined in accordance with ASTM D 3418:2012 by differential scanning calorimetry (DSC) with a scan rate of 10 K/min (cf. Ullmann's Encyclopedia of Industrial Chemistry, 5th edition, volume A 21, VCH Weinheim 1992, p. 169, and also Zosel, Farbe and Lack 82 (1976), pp. 125-134; see also DIN 53765). Alternatively the glass transition temperature $T_g$ may be determined by means of dynamic mechanical analysis (DMA).

A rough estimation of the glass transition temperature of a copolymer for a given monomer composition can be done by the Fox-equation. According to Fox (T. G. Fox, Bull. Am. Phys. Soc. (Ser. II) 1, 123 [1956] and Ullmanns Enzyklopädie der technischen Chemie, Weinheim (1980), pp. 17-18), the glass transition temperature of copolymers with low degrees of crosslinking is given at high molar masses in good approximation by $$\frac{1}{T_g} = \frac{X^1}{T_g^1} + \frac{X^2}{T_g^2} + \ldots \frac{X^n}{T_g^n}$$

where $X^1$, $X^2$, ..., $X^n$ are the mass fractions of the monomers 1, 2, ..., n and $T_g^1$, $T_g^2$, ..., $T_g^n$ are the glass transition temperatures of the polymers composed in each case only of one of the monomers 1, 2, ..., n, in degrees Kelvin. The latter are known, for example, from Ullmann's Encyclopedia of Industrial Chemistry, VCH, Weinheim, vol. A 21 (1992) p. 169 or from J. Brandrup, E. H. Immergut, Polymer Handbook 3rd ed., J. Wiley, New York 1989.

Principally, any non-polymerizable non-polar silicon oil can be used for the purpose of the present invention. Suitable non-polar, non-polymerizable silicon oils do not have a C=C-double bond. A non-polar silicon oil is usually a silicon oil, which has a solubility in water of not more than 1 g/L, in particular not more than 0.1 g/L at $20°$ C.

Preferably, the non-polymerizable, non-polar silicon oil is a polydimethylsiloxane which contains at least 70% by weight, in particular at least 80% by weight and especially at least 90% by weight of dimethylsilyloxy groups, based on the total weight of the silicon oil.

Preferably, the non-polymerizable, non-polar silicon oil is a liquid at $100°$ C., in particular at $40°$ C. and especially at $20°$ C.

Preferably, the non-polymerizable, non-polar silicon oil has a viscosity at $100°$ C., in particular at $40°$ C. and especially at $20°$ C. in the range from 20 mPas to 5 Million mPas.

Preferably, the non-polymerizable, non-polar silicon oil is not volatile, i.e. it has a weight loss of less than 1% at $150°$ C., measured e.g. in a halogen dryer (e.g. a Halogen dryer Mettler Toledo HR 73). In particular it has a boiling point at 1 mbar of at most $200°$ C.

Preferably, the non-polymerizable silicon oil has a weight average molecular weight $M_w$ in the range from 800 to 1000000 Dalton, in particular in the range from 1500 to 800000, especially from 2500 to 500000. The average number of repeating units of DMS are in the range of 10 to 10000, in particular in the range from 20 to 5000 and especially from 30 to 3000.

Suitable non-polar non-polymerizable silicon oils are e.g. selected from the following polydimethylsiloxanes types:

S1: pure polydimethylsiloxanes, i.e. linear or Si-branched polysiloxanes which essentially consist of dimethylsilyloxy groups and terminal trimethylsilyloxy groups, preferably those with $M_w$ in the range from 800 to 1000000 g/mol, especially from 1000 to 500000 g/mol;

S2: α,ω-terminated polydimethylsiloxanes, i.e. linear or Si-branched polysiloxanes having terminal $C_2$-$C_{30}$-alkyl groups, which are interrupted by at least one functional moiety selected from —O—, —OC=O— or —NHC=O—, or terminal $C_1$-$C_{10}$-alkoxy groups, preferably those with $M_w$ in the range from 800 to 100000 g/mol, especially from 1000 to 50000 g/mol;

S3: Polysiloxanes of the formula

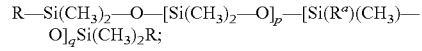

where q is an integer from 1 to 500 and p is and an integer from 0 to 500 with p+q being at least 2, in particular at least 5, e.g. from 2 to 1000, in particular from 5 to 500;

R is $CH_3$, $C_2$-$C_{22}$ alkyl, halogenated $C_1$-$C_{22}$ alkyl, $C_5$-$C_{22}$ cycloalkyl, or an aromatic hydrocarbon radical having 6 to 22 carbon atoms, such as phenyl or phenyl-$C_1$-$C_4$-alkyl, and $R^a$ is $C_2$-$C_{22}$ alkyl, halogenated $C_1$-$C_{22}$ alkyl, $C_5$-$C_{22}$ cycloalkyl, an aromatic hydrocarbon radical having 6 to 22 carbons, such as phenyl or phenyl-$C_1$-$C_4$-alkyl, or —[Si(CH$_3$)$_2$—O]$_n$—[Si(R$^b$)(CH$_3$)—O]$_m$Si(CH$_3$)$_2$R, where n and m are identical or different and an integer from 1 to 100 with n+m being at least 1, R is as defined above and $R^b$ is a radical selected from $C_2$-$C_{22}$ alkyl, halogenated $C_1$-$C_{22}$ alkyl, $C_5$-$C_{22}$ cycloalkyl and an aromatic hydrocarbon radical having 6 to 22 carbons, such as phenyl or phenyl-$C_1$-$C_4$-alkyl.

In the polysiloxanes S3, the moieties —[Si(CH$_3$)$_2$—O]— and —[Si(R$^a$)(CH$_3$)—O]— and, if present, moieties —[Si(CH$_3$)$_2$—O]— and —[Si(R$^b$)(CH$_3$)—O]— may be arranged statistically or blockwise. The polysiloxanes S3 preferably have an $M_w$ in the range from 800 to 500000 g/mol, especially from 1000 to 100000 g/mol.

S4: Polysiloxanes of the formula

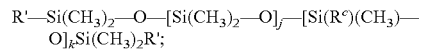

where k is an integer from 1 to 500 and j is and an integer from 0 to 500 with j+k being at least 2, in particular at least 5, e.g. from 2 to 1000, in particular from 5 to 500;

R' is CH$_3$, halogenated C$_1$-C$_{22}$ alkyl, or a C$_2$-C$_{30}$-alkyl group, which is interrupted by at least one functional moiety selected from —O—, —OC=O— or —NHC=O, and R$^c$ is a C$_2$-C$_{30}$-alkyl group, which is interrupted by at least one functional moiety selected from —O—, —OC=O— or —NHC=O—, or —[Si(CH$_3$)$_2$—O]$_n$—[Si(R$^d$)(CH$_3$)—O]$_m$Si(CH$_3$)$_2$R', where n and m are identical or different and an integer from 1 to 100 with n+m being at least 1, R' is as defined above and R$^d$ is a C$_2$-C$_{30}$-alkyl group, which is interrupted by at least one functional moiety selected from —O—, —OC=O— or —NHC=O—.

In the polysiloxanes S4, the moieties —[Si(CH$_3$)$_2$—O]— and —[Si(R$^c$)(CH$_3$)—O]— and, if present, moieties —[Si(CH$_3$)$_2$—O]— and —[Si(R$^d$)(CH$_3$)—O]— may be arranged statistically or blockwise. The polysiloxanes S4 preferably have an M$_w$ in the range from 800 to 500000 g/mol, especially from 1000 to 100000 g/mol.

In the composition of the invention the relative amount of non-polymerizable, non-polar silicon oil is from 0.15 to 2 parts by weight, in particular from 0.3. to 1.8 parts by weight, and especially from 0.5 to 2 parts by weight per 1 part by weight of polymer P, i.e. the weight ratio of non-polymerizable, non-polar silicon oil to polymer P is in the range from 0.15:1 to 2:1, in particular from 0.3:1 to 1.8:1 and especially from 1:2 to 1.5:1. The non-polymerizable, non-polar silicon oil can be a blend of the PDMS types S1 to S4 described above, or mixtures of the same type of PDMS within the same group S1 to S4 of with different molecular weights and structures.

In a particular group of embodiments, the non-polymerizable silicon oil is a single type of PDMS. In another particular group of embodiments the non-polymerizable silicon oil is a mixture of at least two silicon oils having different average molecular weights.

The polymer-silicon oil hybrid composition of the invention preferably contains at least 5% by weight, in particular at least 10% by weight, based on the total weight of the composition, of the non-polymerizable, non-polar silicon oil. Generally the concentration of the non-polymerizable, non-polar silicon oil will not exceed 50% by weight, in particular 40% by weight, based on the total weight of the composition. In particular the concentration of the non-polymerizable, non-polar silicon oil is from 5 to 50% by weight, in particular from 10 to 40% by weight, based on the total weight of the composition.

The composition of the invention preferably contains at least 5% by weight, in particular at least 10% by weight, based on the total weight of the composition, of the polymer P. Generally the concentration of the polymer P will not exceed 40% by weight, in particular 30% by weight, based on the total weight of the composition. In particular the concentration of the polymer P is from 5 to 40% by weight, in particular from 10 to 40% by weight and especially from 10 to 30% by weight, based on the total weight of the composition.

The total amount of polymer P and non-polymerizable, non-polar silicon oil is usually from 10 to 60% by weight, in particular from 15 to 58% by weight and especially from 20 to 50% by weight, based on the total weight of the composition.

In addition to the polymer P and the non-polymerizable, non-polar silicon oil the composition of the invention contain water and at least one surfactant. The amount of water may be usually from 39.9 to 89.9% by weight, in particular form 41.8 to 89.8% by weight and especially from 49.5 to 89.5% by weight, based on the total weight of the composition. The amount of surfactant will usually be from 0.1 to 10% by weight, in particular from 0.2 to 5% by weight and especially from 0.5 to 3% by weight, based on the total weight of the composition. The amount of surfactant may preferably be from 0.2 to 20% by weight, in particular from 0.5 to 10% by weight and especially from 1 to 6% by weight, based on the total amount of the polymer P and the non-polymerizable, non-polar silicon oil.

In particular embodiments of the invention, the compositions of the invention comprise at least one anionic surfactant, more particularly at least one anionic emulsifier, and especially at least one anionic emulsifier which has at least one SO$_3$X group attached via C atom or an O atom, with X being hydrogen or a suitable counterion, such as an alkali metal, alkaline earth metal or ammonium cation, for example sodium, potassium calcium or ammonium. Instead or in combination with the at least one anionic surfactant the composition of the invention may also contain one or more non-ionic surfactants, in particular one or more non-ionic emulsifiers.

The surfactants/emulsifiers are in general not polymerizable, i.e., they do not contain ethylenically unsaturated groups which can be polymerized in a free-radical polymerization. Some or all of the surfactants/emulsifiers, however, may be polymerizable. Such polymerizable surfactants/emulsifiers comprise ethylenically unsaturated groups and are either nonionic or anionic surfactants/emulsifiers. Polymerizable nonionic surfactants/emulsifiers are preferably selected from C$_2$-C$_3$ alkoxylates of alkenols, more particularly of prop-2-en-1-ol, and monoesters of monoethylenically unsaturated monocarboxylic or dicarboxylic acids with poly-C$_2$-C$_3$-alkylene ethers, the degree of alkoxylation being 3 to 100 in each case. Polymerizable anionic surfactants/emulsifiers are preferably selected from the corresponding sulfuric and phosphoric monoesters of the above-mentioned nonionic polymerizable emulsifiers.

The nonpolymerizable anionic surfactants/emulsifiers typically include aliphatic carboxylic acids having in general at least 10 C atoms, e.g., 10 to 20 C atoms, and also their salts, more particularly their ammonium salts and alkali metal salts; aliphatic, araliphatic, and aromatic sulfonic acids having in general at least 6 C atoms, e.g., 6 to 30 C atoms, and also their salts, more particularly their ammonium salts and alkali metal salts; sulfuric monoesters of ethoxylated alkanols and alkylphenols, and also their salts, more particularly their ammonium salts and alkali metal salts; and also alkyl, aralkyl and aryl phosphates, including phosphoric monoesters of alkanols and alkylphenols.

Examples of anionic emulsifiers preferred in accordance with the invention are the salts, more particularly the alkali metal salts and ammonium salts, of di-C$_4$-C$_{12}$-alkyl esters of sulfosuccinic acid such as dibutyl sulfosuccinate, dihexyl sulfosuccinate, dioctyl sulfosuccinate, di(2-ethylhexyl) sulfosuccinate or didecyl sulfosuccinate, C$_{10}$-C$_{20}$-alkyl sulfates such as lauryl sulfate, isotridecyl sulfate or cetyl sulfate, stearyl sulfate;

sulfuric monoesters of ethoxylated C$_{10}$-C$_{20}$-alkanols, having preferably a degree of ethoxylation in the range from 2 to 30, such as the sulfates of (poly)ethoxylated lauryl alcohol, of (poly)ethoxylated isotridecanol, of (poly)ethoxylated myristyl alcohol, of (poly)ethoxylated cetyl alcohol, of (poly)ethoxylated stearyl alcohol, sulfuric monoesters of ethoxylated $C_4$-$C_{18}$-alkylphenols, having preferably a degree of ethoxylation in the range from 2 to 30;

$C_{10}$-$C_{20}$-alkyl sulfonic acids such as laurylsulfonate and isotridecylsulfonate, mono-, di-, and tri-$C_4$-$C_{18}$-alkylarylsulfonic acids such as dibutylnaphthylsulfonate, cumylsulfonate, octylbenzenesulfonate, nonylbenzenesulfonate, dodecylbenzenesulfonate, and tridecylbenzenesulfonate, sulfuric monoesters of di- or tristyrylphenol ethoxylates having preferably a degree of ethoxylation in the range from 2 to 30;

monoesters and diesters of phosphoric acid, including their mixtures with the corresponding triesters, more particularly their esters with $C_8$-$C_{22}$ alkanols, (poly)ethoxylated $C_8$-$C_{22}$ alkanols, $C_4$-$C_{22}$ alkylphenols, (poly)ethoxylated $C_4$-$C_{22}$ alkylphenols, or (poly)ethoxylated di- or tristyrylphenols.

Examples of suitable anionic emulsifiers are also the compounds, indicated below, of the general formula A

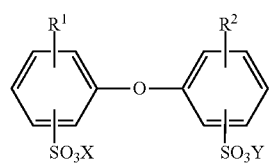

(A)

in which $R^1$ and $R^2$ are hydrogen or $C_4$-$C_{14}$ alkyl and are not simultaneously hydrogen, and X and Y are suitable cations, examples being alkali metal ions and/or ammonium ions. Preferably $R^1$ and $R^2$ are hydrogen or linear or branched alkyl radicals having 6 to 18 C atoms, and more particularly having 6, 12 or 16 C atoms, and $R^1$ and $R^2$ are not both simultaneously hydrogen. X and Y are preferably sodium, potassium or ammonium ions, with sodium being particularly preferred. Particularly advantageous compounds are those in which X and Y are sodium, $R^1$ is a branched alkyl radical having 12 C atoms, and $R^2$ is hydrogen or has one of the non-hydrogen definitions indicated for $R^1$. Use is frequently made of technical mixtures which have a fraction of 50% to 90% by weight of the monoalkylated product, an example being Dowfax® 2A1 (trademark of the Dow Chemical Company).

Preferred anionic emulsifiers are the salts, in particular the alkalimetal and ammonium salts of di-$C_4$-$C_{12}$-alkyl esters of sulfosuccinic acid, $C_{10}$-$C_{20}$-alkyl sulfates, sulfuric monoesters of ethoxylated $C_{10}$-$C_{20}$-alkanols, having preferably a degree of ethoxylation in the range from 2 to 30, sulfuric monoesters of ethoxylated $C_4$-$C_{18}$-alkylphenols, having preferably a degree of ethoxylation in the range from 2 to 30 and compounds of formula A and mixtures thereof.

Suitable nonionic emulsifiers are, commonly, ethoxylated alkanols having 8 to 36 C atoms, more particularly 10 to 22 C atoms, in the alkyl radical, and ethoxylated mono-, di-, and trialkylphenols having, commonly, 4 to 12 C atoms in the alkyl radicals, the ethoxylated alkanols and alkylphenols commonly having a degree of ethoxylation in the range from 3 to 50.

Other suitable emulsifiers are found in, for example, Houben-Weyl, Methoden der organischen Chemie, volume 14/1, Makromolekulare Stoffe, Georg Thieme Verlag, Stuttgart, 1961, pp. 192 to 208.

In preferred embodiments of the invention the at least one surfactant is selected from at least one anionic emulsifier, in particular from at least one of the anionic emulsifiers mentioned above, more particularly from the preferred anionic emulsifiers, and from combinations of at least one anionic emulsifier with one or more other surface-active substances different from the anionic emulsifiers, more particularly from combination of different anionic emulsifiers and from combinations of at least one anionic emulsifier with at least one non-ionic emulsifier.

In particularly preferred embodiments of the invention the at least one surfactant comprises at least one anionic surfactant from the group of the salts of sulfuric monoesters of ethoxylated $C_{10}$-$C_{20}$-alkanols, having preferably a degree of ethoxylation in the range from 2 to 30, such as the sulfates of (poly)ethoxylated lauryl alcohol, of (poly)ethoxylated isotridecanol, of (poly)ethoxylated myristyl alcohol, of (poly)ethoxylated cetyl alcohol, of (poly)ethoxylated stearyl alcohol, preferably in combination with one or more other surface-active substances different from the compound A, more particularly in combination with one or more other anionic emulsifiers selected from the salts of the compounds of formula A the salts of a di-$C_4$-$C_{12}$-alkyl ester of sulfosuccinic acid.

The aqueous compositions of the invention comprise the polymer P and the silicon oil in the form of particles which are dispersed in an aqueous phase. The average particle diameter of the particles as determined by dynamic light scattering does preferably not exceed 1000 nm, in particular 500 nm, more particularly 400 nm and especially 300 nm and is in particular the range from 20 to 500 nm, preferably in the range from 40 to 400 nm, and more particularly in the range from 50 to 300 nm. In this context it has proven advantageous if the fraction of the polymer-active ingredient particles which having a particle diameter of greater than 500 nm, in particular a particle diameter greater than 400 ($D_{50}$ of the particle size distribution) is less than 10% by weight, based on the total amount of particles in the composition.

The particle sizes/particle diameters or particle radii indicated here for the polymer-active ingredient particles are particle diameters as may be determined by means of photon correlation spectroscopy (PCS), also known as quasi-elastic light scattering (QELS) or dynamic light scattering. The average particle diameters constitute the average value of the cumulant analysis (mean of fits). This "mean of fits" is an average, intensity-weighted particle diameter in nm, which corresponds to the weight-average particle diameter. The measurement method is described in the ISO 13321 standard. Processes for this purpose are familiar to the skilled worker, moreover, from the relevant technical literature—for example, from H. Wiese in D. Distler, Wässrige Polymerdispersionen, Wiley-VCH 1999, section 4.2.1, p. 40ff and literature cited therein, and also H. Auweter, D. Horn, J. Colloid Interf. Sci. 105 (1985) 399, D. Lilge, D. Horn, Colloid Polym. Sci. 269 (1991) 704 or H. Wiese, D. Horn, J. Chem. Phys. 94 (1991) 6429. The particle diameters indicated here relate to the values determined at 20° C. and 101.325 hPa on 0.001-1% by weight dispersions. The determination of the average particle diameters may also be performed by means of hydrodynamic chromatography (HDC) using a Particle Size Distribution Analyser (PSDA, Varian Deutschland GmbH) with a number 2 (standard) cartridge at a wavelength of 254 nm (measurement temperature 23° C. and measurement time 480 seconds).

The aqueous phase comprises the surface-active substance and may further comprise typical additives in dissolved or suspended or emulsified form. Examples of such additives, besides the aforementioned surface-active substances which serve to stabilize the polymer-silicon oil hybrid particles, are antifoams, preservatives (bactericides), antifreeze agents, and agents for adjusting the pH.

Examples of suitable antifoams include silicone emulsions (such as, for example, Silikon® SRE, Wacker or Rhodorsil®, from Rhodia), long-chain alcohols and mixtures thereof, fatty acids, fatty acid esters of polyglycerols, organofluorine compounds, organically modified polysiloxanes, and mixtures thereof. Antifoams are used typically in amounts of 0.01 to 5 grams per liter of the composition of the invention.

Preservatives may be added in order to stabilize the active ingredient compositions of the invention against infestation with microorganisms. Examples of suitable preservatives include alkyl esters of para-hydroxybenzoic acid, sodium benzoate, 2-bromo-2-nitropropane-1,3-diol, ortho-phenylphenol, dichlorophen, benzyl alcohol hemiformal, pentachlorophenol, 2,4-dichlorobenzyl alcohol, and also, in particular, substituted isothiazolones such as, for example, $C_1$-$C_{10}$-alkylisothiazolinones, 5-chloro-2-methyl-4-isothiazolinone, and benzoisothiazolinones, examples being the products sold under the name Proxel® from Avecia (or from Arch) or Acticide® from Thor Chemie. Preservatives are used typically in amounts of 0.01 to 10 grams per liter of the composition of the invention.

Suitable antifreeze agents are organic polyols, e.g., ethylene glycol, propylene glycol or glycerol. They are used typically in amounts of not more than 10% by weight, based on the total weight of composition.

The aqueous compositions of the invention are prepared by emulsion polymerization of a solution of the non-polymerizable, non-polar silicon oil in the ethylenically unsaturated monomers M forming the polymer P. The concentration of the non-polymerizable, non-polar silicon oil is at least 15%, by weight, in particular at least 30% by weight, especially at least 50% by weight, based on the amount of monomer M, and may be as high as 200% by weight, in particular not more than 180% by weight, and especially not more than 150% by weight, i.e. the weight ratio of non-polymerizable, non-polar silicon oil to monomers M is in the range from 0.15:1 to 2:1, in particular from 0.3:1 to 1.8:1 and especially from 1:2 to 1.5:1.

For emulsion polymerization usually an O/W-emulsion of a solution of the non-polymerizable, non-polar silicon oil in the monomers M is prepared by mixing the solution of the non-polymerizable, non-polar silicon oil in the monomers M with water and at least one surfactant as described herein. The O/W-emulsion can be prepared in a conventional manner, e.g. by stirring the solution of the non-polymerizable, non-polar silicon oil in the monomers M in an aqueous solution of the at least one surfactant. The aqueous emulsion of the non-polymerizable, non-polar silicon oil and the monomers M is then subjected to a radical emulsion polymerization. It is also possible to mix the monomers, the non-polymerisable, non-polar silicon oil with water and surfactant for a sufficient time to achieve dissolution of the non-polar silicon oil in the monomers M to obtain an O/W-emulsion, where the oil phase is of a solution of the non-polymerizable, non-polar silicon oil in the monomers M.

The emulsion polymerization can be performed by analogy to conventional emulsion polymerization techniques, in particular by radical emulsion polymerization.

The radical emulsion polymerization is usually initiated by a radical initiator, i.e. a compound, which, on exposure to heat or light, decomposes and forms free radicals, which triggers a radical polymerization of the ethylenically unsaturated monomers M. The initiators that are suitable for the emulsion polymerization of the invention are the polymerization initiators which are suitable and used typically for an emulsion polymerization, and which trigger free-radical polymerization of the monomers M. These initiators include azo compounds such as 2,2'-azobisisobutyronitrile, 2,2'-azobis(2-methyl-butyronitrile), 2,2'-azobis(2,4-dimethylvaleronitrile), 2,2'-azobis(4-methoxy-2,4-dimethylvaleronitrile), 1,1'-azobis(1-cyclohexanecarbonitrile), 2,2'-azobis(isobutyramide) dihydrate, 2-phenylazo-2,4-dimethyl-4-methoxyvaleronitrile, dimethyl-2,2'-azobisisobutyrate, 2-(carb-amoylazo)isobutyronitrile, 2,2'-azobis(2,4,4-trimethylpentane), 2,2'-azobis(2-methylpropane), 2,2'-azobis(N,N'-dimethyleneisobutyramidine), free base or hydrochloride, 2,2'-azobis(2-amidinopropane), free base or hydrochloride, 2,2'-azobis{2-methyl-N[1,1-bis(hydroxy-methyl)ethyl]propionamide} or 2,2'-azobis{2-methyl-N[1,1-bis(hydroxymethyl)-2-hydroxyethyl]propionamide;

organic peroxides or hydroperoxides such as acetyl cyclohexane sulphonyl peroxide, diisopropyl peroxy dicarbonate, t-amyl perneodecanoate, t-butyl perneodecanoate, t-butyl perpivalate, t-amylperpivalate, bis(2,4-dichlorobenzoyl)peroxide, diisononanoyl peroxide, didecanoyl peroxide, dioctanoyl peroxide, dilauroyl peroxide, bis (2-methylbenzoyl) peroxide, disuccinic acid peroxide, di-acetyl peroxide, dibenzoyl peroxide, t-butyl per 2-ethylhexanoate, bis-(4-chlorobenzoyl)-peroxide, t-butyl perisobutyrate, t-butyl permaleinate, 1,1-bis(t-butylperoxy)3,5,5-trimethyl-cyclohexane, 1,1-bis(t-butylperoxy)cyclohexane, t-butyl peroxy isopropyl carbonate, t-butyl perisononaoate, 2,5-dimethylhexane 2,5-dibenzoate, t-butyl peracetate, t-amyl perbenzoate, t-butyl perbenzoate, 2,2-bis (t-butylperoxy) butane, 2,2 bis (t-butylperoxy) propane, dicumyl peroxide, 2,5-dimethylhexane-2,5-di-t-butylperoxide, 3-t-butylperoxy 3-phenylphthalide, di-t-amyl peroxide, [alpha], [alpha]'-bis(t-butylperoxy isopropyl) benzene, 3,5-bis (t-butylperoxy)3,5-dimethyl 1,2-dioxolane, di-t-butyl peroxide, 2,5-dimethylhexyne-2,5-di-t-butylperoxide, 3,3,6,6,9,9-hexamethyl 1,2,4,5-tetraoxa cyclononane, p-menthane hydroperoxide, pinane hydroperoxide, diisopropylbenzene mono-[alpha]-hydroperoxide, cumene hydroperoxide, t-butyl hydroperoxide and diisopropyl peroxidicarbamate, inorganic peroxides and hydroperoxides such as $H_2O_2$ and salts of peroxodisulfuric acid such as sodium peroxodisulfate, and redox initiator systems, which comprise an oxidizing agent, e.g. one or more of the aforementioned organic or inorganic peroxides or hydroperoxides and a reducing agent, e.g. a sulfur compound which more particularly is selected from sodium hydrogen sulfite, sodium hydroxymethanesulfinate, and the adduct of hydrogen sulfite with acetone, or ascorbic acid. Redox initiator systems may further comprise an addition of small amounts of redox metal salts such as iron salts, vanadium salts, copper salts, chromium salts or manganese salts, such as in the ascorbic acid/iron(II) sulfate sodium peroxodisulfate redox initiator system, for example.

It is preferred to use water-soluble initiators, examples being salts of peroxodisulfuric acid, more particularly sodium, potassium or ammonium salts, or a redox initiator system comprising as oxidizing agent a salt of peroxodisulfuric acid, hydrogen peroxide or an organic peroxide such as tert-butyl hydroperoxide. As reducing agents they preferably comprise a sulfur compound which more particularly is selected from sodium hydrogen sulfite, sodium hydroxymethanesulfinate, and the adduct of hydrogen sulfite with acetone. Other suitable reducing agents are phosphorus-containing compounds such as phosphorous acid, hypophosphites, and phosphinates, and also hydrazine or hydrazine hydrate, and ascorbic acid.

The initiator is used typically in an amount of 0.02% to 2%, and more particularly 0.05% to 1.5%, by weight, based on the amount of monomers M. The optimum amount of initiator is of course dependent on the initiator system used and can be determined by the skilled worker in routine experiments. The initiator may be included partly or wholly in the initial charge to the reaction vessel. It is also possible to add the major amount of the initiator, more particularly at least 60%, e.g., 60% to 100% or 70 to 99.5% of the initiator, to the polymerization reactor in the course of the polymerization.

Polymerization temperature and polymerization pressure are of minor importance. The emulsion polymerization takes place typically at temperatures in the range from 30 to 130, preferably in the range from 50 to 100° C. The polymerization pressure is situated customarily in the region of atmospheric pressure, i.e., at ambient pressure, but may also be slightly above or below, in the range, for example, of 800 to 1500 mbar.

It has been found advantageous, if the average droplet size of the oil phase in the aqueous oil-in water emulsion, which is subjected to the emulsion polymerization, is less than 1000 nm, in particular from 20 to 500 nm, especially from 50 to 400 nm, as determined by dynamic light scattering. In contrast to conventional emulsions, which are also termed macro-emulsions and wherein the average particle size of the emulsion is usually 1.5 µm or higher, e.g. from 2 µm to 50 µm, emulsions having an average droplet size of less than 1 µm (i.e. less than 1000 nm), in particular from 20 to 500 nm, especially from 50 to 400 nm are termed mini-emulsions. Thus, according to a preferred embodiment of the process of the invention, the emulsion is carried out as a mini-emulsion polymerization, i.e. an emulsion polymerization, where the O/W-emulsion of the solution of the non-polymerizable, non-polar silicon oil in the monomers M is an aqueous mini-emulsion.

The mini-emulsion of the solution of the non-polymerizable, non-polar silicon oil in the monomers M can be prepared from a OW-macro emulsion of the of the solution of the non-polymerizable, non-polar silicon oil in the monomers M by subjecting the macro-emulsion to strong shear forces, thereby achieving a comminution of the large droplest of the macro-emulsion to the desired droplet size. The means for transforming a conventional macro-emulsion to a mini-emulsion are known from prior art and can be applied to the OW-macro emulsion of the of the solution of the non-polymerizable, non-polar silicon oil in the monomers M. Suitable means have been described e.g. in Prog. Polym. Sci. 2002, 27, 689, US 2006/0287416 and WO 2008/003601 and the literature cited therein. Comminution may be achieved by using high shear force dispersion devices like for example a ultrasonic sound equipment (J. Dispersion Sci. Technology 2002, 23(1-3), 333-349) or a high pressure homogenizer (APV Gaulin homogenizer; Microfluidizer) The emulsification and comminution can be carried out continuously or batchwise. Apparatus for this purpose are known in the art. This is for example described in U.S. Pat. No. 5,108,654.

A particular preferred embodiment of the process of the invention comprises the following steps.
i. dissolving the non-polymerizable silicon oil in the ethylenically unsaturated monomers M;
ii. emulsifying the solution of the non-polymerizable silicon oil obtained in step i. in water containing at least one surfactant, whereby a conventional oil-in-water emulsion (macro-emulsion) is obtained;
iii. comminuting the droplet size of the conventional oil-in-water emulsion of step ii. to obtain an aqueous oil-in water mini-emulsion, i.e. an aqueous O/W emulsion having an average droplet size, determined by dynamic light scattering, of below 1000 nm, in particular to a droplet size in the range from 20 to 500 nm especially in the range from 50 to 400 nm;
iv. initiation a free-radical polymerization in the aqueous oil-in water mini-emulsion of step iii.

Steps i. and ii. may be performed as subsequent steps or as a single step. I.e. it is possible to mix the non-polymerizable silicon oil and the ethylenically unsaturated monomers M with the aqueous solution of the at least one surfactant and agitate the mixture until the non-polymerizable silicon oil is dissolved in the ethylenically unsaturated monomers M and the solution is emulsified. However, it is preferred to perform steps i. and ii. in succession. In particular, it is preferred to perform steps i. to iv. in succession.

The free-radical polymerization in the aqueous oil-in water mini-emulsion of step iii is usually initiated by adding the polymerization initiator to the mini-emulsion, optionally accompanied by heating to the polymerization temperature, if necessary. The initiator may be included partly or wholly in the mini-emulsion before heating. It is also possible to add the major amount of the initiator, more particularly at least 60%, e.g., 60% to 100% or 70 to 99.5% of the initiator, to the mini-emulsion in the course of the polymerization under polymerization conditions, i.e. at elevated temperature. If a redox-initiator system is used, it is of course possible to add a portion or the complete amount of either the reducing or the oxidizing agent to the miniemulsion, then heating the mini-emulsion in a polymerization vessel to the polymerization temperature and then adding the remainder of redox initiator system to the polymerization vessel. During polymerization the mini-emulsion may be agitated, e.g. stirred.

The aqueous polymer-silicon oil hybrid composition, hereinafter also termed polymer dispersion, which is obtained by the process of the invention, may be subjected to a deodorization to remove residual monomers. Deodorization may be achieved by chemical means, e.g. by addition of a further radical polymerization initiator as described above or physically, e.g. by stripping with steam, or by combined physical or chemical deodorization.

Typically, after the completion of the polymerization, a base may be added to the respective polymerization mixture in order to establish a pH-value in a basic range of generally 7.5 to 10.5 and preferably 8.5 to 10. Preferred bases in this context are selected from aqueous ammonia (i.e. ammonium hydroxide) and organic amines, such as triethanolamine, diethanolamine, propanolamine, aminomethylpropanol or polyethylene amines, such as Jeffamines®.

After they have been prepared as described above, the aqueous polymer dispersions of the invention may be further stabilized by addition of an anionic surface-active substance. Preferred for this purpose are the dialkyl esters of sulfosuccinic acid or their salts, more particularly the sodium salts, especially the dialkyl esters of sulfosuccinic acid having 6 to 12 C atoms per alkyl radical. In one group of embodiments, no such additional anionic surface-active substance is admixed with the aqueous polymer dispersion.

In general the aqueous polymer dispersion may be stabilized with one or more biocides (preservatives) to counter infestation by microorganisms. These biocides include, for example, alkyl esters of para-hydroxybenzoic acid, sodium benzoate, 2-bromo-2-nitropropane-1,3-diol, ortho-phenylphenol, dichlorophen, benzyl alcohol hemiformal, pentachlorophenol, 2,4-dichlorobenzyl alcohol and also, in particular, substituted isothiazolones such as, for example, $C_1$-$C_{10}$ alkylisothiazolinones, 5-chloro-2-methyl-4-isothiazolinone, and benzoisothiazolinones, examples being the products sold under the names Proxel® from Avecia (or Arch) or Acticide® from Thor Chemie. Preservatives are used typically in amounts from 0.01 to 10 grams per liter of the polymer dispersion.

As already mentioned above, the aqueous polymer-silicon oil hybrid compositions according to the invention, in particular the aqueous polymer-silicon oil hybrid composition obtained by the process of the present invention, especially by the mini-emulsion polymerization as described above, are suitable as additives in water based coating and printing ink formulations, more particularly in aqueous compositions which comprise at least one organic polymer P' as a binder, where the polymer P' is in particular present in the form of finely dispersed polymer particles.

In coating and printing ink compositions of these kinds, the aqueous polymer-silicon oil hybrid compositions according to the invention act as additives which promote the uniform spread of the coating or printing ink composition over the substrate surface to be coated, and therefore lead to smoother coatings than in the case of unadditized coating material formulations. Moreover, the aqueous polymer-silicon oil hybrid compositions of the invention reduce the static or dynamic friction of the coating and increase their anti-blocking properties. Moreover, the coating or printing ink composition comprising them impart hydrophobic properties or water-repellency to the coating and provide an enhanced soil repellency effect, more particularly a water repellency effect, and the aqueous polymer-silicon oil hybrid compositions are therefore suitable for reducing the soiling tendency of coatings, and also act as an anti-graffiti additive.

Therefore, the present invention relates in particular to the use of the aqueous polymer-silicon oil hybrid compositions of the invention as an additive in aqueous coating compositions, which contain at least one organic polymer P' as a binder, where the polymer P' is in particular present in the form of finely dispersed polymer particles. The aqueous polymer-silicon oil hybrid compositions of the invention are in particular useful for imparting at least one of the following benefits to the coating compositions or to the coatings obtained therefrom:

reduction of the static or dynamic friction of the coating or print;
increasing the anti-blocking properties of the coating or print;
increasing stain resistance of the coating or print;
increased soil-repellency of the coating or print;
imparting anti-graffity properties to a coating or print;
imparting hydrophobic properties or water-repellency to the coating or print.

The organic polymer P' which is used in the aqueous coating printing ink compositions may be principally any binder polymer or polymer mixture, which is conventionally used in aqueous coating compositions. It is usually present in dispersed form, e.g. as a polymer latex, which is dispersed in the aqueous phase of the coating composition.

Frequently, the polymer P' is a latex polymer which is obtained by emulsion polymerisation of ethylenically unsaturated monomers. However, the dispersion of the polymer P' may also be a dispersion of a polyester, polycarbonate, polyamide, polyurethane, polyether urethane or polyester urethane polymer.

Frequently, the polymer P' is a physically drying polymer, i.e. the polymer P' simply forms a polymer film upon drying of the aqueous coating composition. The aqueous coating composition may, however, be a thermally curing or radiation-curable compositions. A radiation-curable composition means formulations which comprise a binder based on photopolymerizable polymers that cure to a polymeric network in the presence of light or actinic radiation. The photopolymerizable have on average at least two ethylenically unsaturated groups, especially acrylate, methacrylate, or allyl groups, examples being urethane acrylates, polyether acrylates, and polyester acrylates. The aqueous coating composition may also be an oxidatively curing composition. By oxidatively curing formulations are meant formulations which as binder comprise an oligomeric or polymeric substance which cures to a solid polymer film in the presence of oxygen. Examples of such substances are unsaturated fatty acids and esters of unsaturated fatty acids, examples being alkyd resins based on unsaturated fatty acids.

In a preferred embodiment of the present invention, the polymer P' is a latex polymer, which is obtained by emulsion polymerisation of ethylenically unsaturated monomers M'. Preferably, the monomers M' comprise at least 80% by weight, in particular at least 90% by weight, based on the total weight of the monomers M', of at least one monomer M1, especially at least one monomer M1a or a mixture thereof with one or more monomers M1b, where in the mixture preferably comprises at least 80% by weight, of monomers M1a and at most 20% by weight of monomers M1b, based on the total weight of monomers M1. In addition to the monomers M1 the monomers M' forming this latex polymer may comprise one or more further ethylenically unsaturated monomers, e.g. one or more of the monomers M2 mentioned above. The amount of monomers M2 will generally not exceed 20% by weight, in particular 10% by weight, based on the total amount of monomers M'.

In one particularly preferred embodiment of the invention the constituent monomers M' of the polymer P' comprise:

80% to 99.79% by weight, more particularly 85% to 98.75% by weight, and especially 90% to 99.5% by weight, of at least one monomer M1a, which are in particular selected from the group consisting of the esters of monoethylenically unsaturated $C_3$-$C_6$ monocarboxylic acids with $C_1$-$C_{10}$ alkanols, vinylaromatic hydrocarbons, and the mixtures of these monomers;

0.1% to 10% by weight, more particularly 0.1% to 5% by weight, and especially 0.2% to 3% by weight, by weight, of at least one monoethylenically unsaturated monomer, selected from the monomers M2b and M2c, more particularly acrylic acid and/or methacrylic acid, including the salts thereof, acrylamide, methacrylamide, hydroxy-$C_1$-$C_4$-alkyl acrylates, hydroxy-$C_1$-$C_4$-alkyl methacrylates and monoethylenically unsaturated monomers having an urea group, where the urea group may be part of a saturated heterocyclic ring, such as an imidazolinone ring, examples including N-acryloxyethylimidazolin-2-one and N-methacryloxyethylimidazolin-2-one; and optionally one or more further monomers, selected from
- 0.1 to 20% by weight, in particular 0.02 to 10% by weight or 0.02 to 5% by weight of monomers M1b,;
- 0.01 to 5% by weight, in particular 0.01 to 2% by weight or 0.02 to 1% by weight of monomers M2a, especially selected from diesters of acrylic acid or of methacrylic acid with $C_3$-$C_{10}$ alkanediols, such as 1,4-butanediol diacrylate or 1,6-hexanediol diacrylate, and the diesters of acrylic acid or of methacrylic acid with diethylene glycol, triethylene glycol or tetraethylene glycol;
- 0.01% to 20% by weight, more particularly 0.02% to 15% by weight, and especially 0.02% to 5% by weight, of one or more monoethylenically unsaturated monomer M3, which in addition to the ethylenically unsaturated double bond have a reactive functional group selected from oxirane group, keto group, aldehyde group and tri-$C_1$-$C_4$-alkylsilyloxy group examples thereof being diacetone acrylamide, glycidylacrylate, glycidylmethacrylate, trimethylsilylacrylate and trimethylsilylmethacrylate;

all figures in % by weight being based on the total weight of the constituent monomers M' of the polymer.

The glass transition temperature $T_g$ of the polymer P', determined by means of dynamic scanning calorimetry (DSC) in accordance with ASTM-D 3418:2012, will depend on the application purpose and generally has a glass transition temperature $T_g$ of at least −20° C., in particular at least −10° C. and especially at least 0° C. In particular the glass transition temperature will not exceed 110° C., in particular 60° C. The polymer P' may be a multiphase polymer, wherein the polymer particles comprise at least two polymers P'(1) and P'(2) having different glass transition temperatures, e.g a first polymer P'(1) having a glass transition temperature Tg(1) in the range from −20° C. to 60° C., in particular from −10° C. to 50° C. or from 0° C. to 40° C. and at least a second polymer P' (2) having a glass transition temperature Tg(2), which is at least 10 K and especially at least 20 K higher than the glass transition temperature Tg(2), e.g. Tg(2) is in the range from 10° C. to 150° C., in particular from 30° C. to 150° C. or from 50° C. to 120° C. In the polymer P' the weight ratio of polymer P'(1) to polymer P'(2) is preferably from 100:1 to 1:5, in particular from 75:1 to 1:2 and especially from 50:1 to 1:1.

In the coating composition, the polymer P' is preferably present in the form of particles which are dispersed in an aqueous phase. The average particle diameter of the particles of the polymer P', as determined by dynamic light scattering does preferably not exceed 1000 nm, in particular 500 nm, more particularly 400 nm and especially 300 nm and is in particular the range from 20 to 500 nm, preferably in the range from 40 to 400 nm, and more particularly in the range from 50 to 300 nm.

Preferably, the coating composition contains aqueous polymer-silicon oil hybrid composition in such an amount that the amount of non-polymerizable silicon oil is from 0.1 to 20% by weight, in particular from 0.5 to 5% by weight, based on the amount of binder polymer P'.

Besides the binder polymer P' and the aqueous polymer-silicon oil hybrid composition of the invention, the coating compositions may comprise one or more constituents of the type that may typically be present in coating material formulations. The nature of these additional constituents is guided conventionally by the desired end use and by the particular binder system.

The further constituents include, in particular, colorants, such as dyes and pigments, fillers, liquid solvents and diluents, including those known as reactive diluents, and also conventional additives.

Suitable colorants are, in particular, organic and inorganic pigments. Examples of organic pigments are color pigments and mother-of-pearl-like pigments such as azo, disazo, naphthol, benzimidazolone, azo condensation, metal complex, isoindolinone, quinophthalone, and dioxazine pigments, polycyclic pigments such as indigo, thioindigo, quinacridones, phthalocyanines, perylenes, perinones, anthraquinones, e.g., aminoanthraquinones or hydroxyanthraquinones, anthrapyrimidines, indanthrones, flavanthrones, pyranthrones, anthanthrones, isoviolanthrones, diketopyrrolopyrroles, and also carbazoles, e.g., carbazole violet, and the like. Other examples of organic pigments can be found in the following monograph: W. Herbst, K. Hunger, "Industrielle Organische Pigmente", 2nd edition, 1995, VCH Verlagsgesellschaft, ISBN: 3-527-28744-2. Examples of inorganic pigments are metallic flakes, such as aluminum, and also aluminum oxide, iron (III) oxide, chromium (III) oxide, titanium (IV) oxide, zirconium (IV) oxide, zinc oxide, zinc sulfide, zinc phosphate, mixed metal oxide phosphates, molybdenum sulfide, cadmium sulfide, graphite, vanadates such as bismuth vanadate, chromates, such as lead (IV) chromates, molybdates such as lead (IV) molybdate, and mixtures thereof.

Suitable fillers are, for example, organic or inorganic particulate materials such as, for example, calcium carbonates and silicates, and also inorganic fiber materials such as glass fibers, for example. Organic fillers as well, such as carbon fibers, and mixtures of organic and inorganic fillers, such as mixtures of glass fibers and carbon fibers or mixtures of carbon fibers and inorganic fillers, for example, may find application. The fillers can be added in an amount of 1 to 75 wt. %, based on the total weight of the composition.

Suitable conventional additives include, for example, antioxidants, UV absorbers/light stabilizers, metal deactivators, antistats, reinforcers, dispersants, defoamers, fillers, antifogging agents, propellants, biocides, plasticizers, lubricants, emulsifiers, rheological agents, catalysts, photoinitiators, adhesion regulators, optical brighteners, flame retardants, antidrip agents, and nucleating agents, and also mixtures thereof.

The choice of suitable conventional additives for the composition of the invention is dependent on the particular end use of the coating material formulations, and may be determined in an individual case by the skilled person.

The application of the coating composition for the purpose of producing a coating on a substrate may take place by any customary application methods such as, for example, spraying, knife coating, spreading, pouring, dipping, or rolling. It is preferred to employ spray application methods such as, for example, compressed air spraying, airless spraying, high-speed rotation, electrostatic spray application (ESTA), optionally in conjunction with hot spray application, such as hot air spraying, for example.

Printing ink formulations can be of any known type like water-based overprint varnishes, flexographic inks, gravure and lithographic inks. They are applied by conventional printing techniques.

The above-described application methods can also be employed, of course, in the production of further coating films or of the basecoat film in the context of the production of a multicoat system. In this case, different coating materials may be employed to build up the various coats. Application to a topcoat film is preferred. Substrates contemplated include all surfaces to be coated or printed that are amenable to combined curing, both primed and unprimed surfaces, examples being metals, plastics, wood, ceramic, stone, textile, fiber composites, paper, paperboard, wallpaper, leather, glass, glass fibers, glass wool, rockwool, mineral-bound and resin-bound building materials such as plasterboard panels and cement slabs, or roofing shingles.

The examples below serve to illustrate the invention.
The following abbreviations were used:
wt %: % by weight
SMA: stearyl methacrylate
MMA: methyl methacrylate
MAA: methacrylic acid
BDDA: butanediol diacrylate
DMS: dimethylsilyl
PDMS: polydimethylsiloxane
AMP: aminomethylpropanol
COF: coefficient of friction
COF-DYN: dynamic coefficient of friction
GPC: gel permeation chromatography
$M_w$: weight average molecular weight
$M_n$: number average molecular weight
Pdi: polydispersity index, i.e. the ratio $M_w/M_n$
Analytics:

The COF and COF-DYN were determined using a COF tester from Labthink Instruments Co. Ltd. by the "pullmeter" method (ASTM C-1028-96).

Particle size was determined by using a NANO-flex particle sizer from Microtrac using 780 nm laser light (3 mW) at a 180° scattering angle. Measurements were done with samples telle quelle diluted to the required concentration with demineralized water at room temperature.

Visosities were determined at with an Anton Paar MCR 302 rheometer at increasing shear rates from 0.01 $s^{-1}$ to 10000 $s^{-1}$ over a time span of 325 seconds at 23° C.

Glastransition temperatures were determined in accordance with ASTM-D 3418:2012 or calculated by using the Fox equation.

Molecular weights were determined by GPC. The molecular weights given for commercial products are the molecular weights given by the producer.

Materials used:
Silicon oil 1:
In a three necked 250 ml flask equipped with a stirrer and nitrogen inlet, 100 g of octamethylcyclosiloxane (33.7 mmol), 6.28 g of 1,3-divinyltetramethyldisiloxane (3.37 mmol) and three drops of trifluormethansulfonic acid were heated to 70° C. under a nitrogen atmosphere. After reaching a solid content of 87 wt %, sodium hydrogencarbonate (0.2 g) was added, the mixture was cooled to 22° C. with stirring and filtered to clearness. The volatiles were removed under reduced pressure until a solid content of >99 wt % was achieved. The resulting colorless low viscous oil had a $M_w$ of 4470 g/mol (by GPC). The average vinyl functionality was 2 per polymer (by NMR).

Silicon oil 2: Commercial linear polymethylalkylsiloxane having $C_8$ and $C_{12}$-alkyl side chains and $C_6$ side chains interrupted by an ether group. The number average molecular weight is given as Mn 6800 g/mol (pdi 2.0).

Silicon oil 3: Commercial linear polymethylalkylsiloxane with alkyl groups having of $C_{12}$-alkyl side chains and an aliphatic $C_6$ side chains interrupted by an ether group. The number average molecular weight is given as Mn 6600 g/mol (pdi 2.1).

Silicon oil 4: Polydimethylsiloxane, $M_w$ 5900 g/mol (M100 oil)

Silicon oil 5: Polydimethylsiloxane, $M_w$ 2000 g/mol (M20 oil)

Silicon oil 6: Polydimethylsiloxane, $M_w$ 9000 g/mol (M200 oil)

Silicon oil 7: Polydimethylsiloxane, $M_w$ 17000 g/mol (M500 oil)

Silicon oil 8: Polydimethylsiloxane, $M_w$ 28000 g/mol (M1000 oil)

Silicon oil 9: Polydimethylsiloxane, $M_w$ 63000 g/mol (M12.500 oil)

Silicon oil 10: Polyether modified polydimethylsiloxane (EFKA 3299 of BASF SE)

Silicone oils 5, 8 and 9 were obtained from Kurt Obermeier GmbH & Co. KG (Korasilon M oil series). Silicone oils 4, 6 and 7 were obtained from Momentive (Element 14 PDMS series)

Surfactant 1: 31% by weight aqueous solution of the sodium salt of a semi-ester of sulfuric acid with an ethoxylated lauryl alcohol Surfactant 2: Ethoxylated isodecanol (Lutensol ON 70 BASF)

Binder polymer dispersion: Neocryl® XK 90 (from DSM), Core-Shell All-Acrylic polymer; 45% solids in water Substrate wetter: EFKA® 3570 (BASF), 60% active in water Rongalit C: Hydroxymethansulfinat, sodium salt

EXAMPLE 1

81.6 g of Silicon oil 2 (100% active polysiloxane) were dissolved in 68.4 g of MMA, 6.08 g of SMA, 1.52 g of MAA and 0.23 g of BDDA. The oil phase was added dropwise to a stirred solution of 20.1 g of surfactant 1 in 202 g of deionised water. The mixture was stirred for 30 min treated with ultrasound using a Bandelin Sonoplus, Generator GM 2200, 200 W, 20 kHz, at 60% power for 20 minutes per 500 g of emulsion. A kinetically stable miniemulsion was obtained, wherein the average droplet size was 147 nm.

3.8 g of a 10 wt % aqueous solution of t-butyl hydroperoxide was added to the miniemulsion. The miniemulsion was heated to 40° C. To the reactor 15.8 g of a 4.8 wt % aqueous solution of Rongalit C was added at 40° C. within 1 hour. The reaction mixture was continuously stirred by a mechanical stirrer and was maintained at 60° C. for 1 hour, then cooled to 22° C. Then the pH of the obtained polymer dispersion was adjusted to 8.6 by addition of 0.87 g of AMP and the dispersion was filtered via a 200 µm filter. The resulting dispersion had a particle size $D_{INT}$ of 119 nm with a polydispersity of 22%. The final active content (calculated as silicon oil 2) was 20 wt %, the solid content was 41.0 wt %. The residual monomer content (MMA) was 40 ppm. The aspect was a white, low viscous (<100 mPas) dispersion.

EXAMPLE 2

81.6 g of Silicon oil 3 (100% active polysiloxane) was dissolved in 68.4 g of MMA, 6.08 g of SMA, 1.52 g of MAA and 0.23 g of BDDA. The oil phase was added dropwise to a stirred solution of 20.1 g of surfactant 1 in 202 g of deionised water. The mixture was stirred for 30 min treated with ultrasound using a Bandelin Sonoplus, Generator GM 2200, 200 W, 20 kHz, at 60% power for 20 minutes per 500 g of emulsion. A kinetically stable miniemulsion was obtained, wherein the average droplet size was 154 nm.

3.8 g of 10 wt % aqueous solution of t-butyl hydroperoxide was added to the miniemulsion. The miniemulsion was heated to 40° C. To the reactor 15.8 g of a 4.8 wt % aqueous solution of Rongalit C was added at 40° C. within 1 hour. The reaction mixture was continuously stirred by a mechanical stirrer and was maintained at 60° C. for 1 hour, then cooled to 22° C. Then the pH of the obtained polymer dispersion was adjusted to 8.7 by addition of 0.48 g of AMP and the dispersion was filtered via a 200 μm filter. The resulting dispersion had a particle size $D_{INT}$ was 133 nm with a polydispersity of 37%. The final active content (calculated as silicon oil 3) was 20 wt %, the solid content was 41.3 wt %. The residual monomer content (MMA) was 120 ppm. The aspect was a white, low viscous (<100 mPas) dispersion.

In an analogous fashion as described for the examples 1 and 2 above, the following silicone dispersions were prepared.

EXAMPLE 3

The polymer dispersion was prepared by analogy to example 1, using silicon oil 4 instead of silicon oil 2. The resulting polymer hybrid dispersion had a particle size $D_{INT}$ of 106 nm and polydispersity of 33%, a solids content of 40.6% and a residual monomer content of 90 ppm of MMA. The pH was corrected to 8.9 with AMP. The glass transition temperature of the polymer matrix was 105° C.

EXAMPLE 4

The polymer dispersion was prepared by analogy to example 1, using silicon oil 4 instead of silicon oil 2 and a monomer composition comprising 32 wt % MMA, 58 wt % 2-ethylhexylacrylate, 8 wt % SMA, 2 wt % MAA and 0.3 wt % BDDA. The resulting polymer hybrid dispersion had a particle size $D_{INT}$ of 122 nm and polydispersity of 41%, a solids content of 41.5% and a residual monomer content of 10 ppm of MMA. The pH was corrected to 8.9 with AMP. The glass transition temperature of the polymer matrix was 0° C.

EXAMPLE 5

The polymer dispersion was prepared by analogy to example 1, using silicon oil 4 instead of silicon oil 2. The resulting polymer hybrid dispersion had a particle size $D_{INT}$ of 114 nm and polydispersity of 36%, a solids content of 40.0% and a residual monomer content of 270 ppm of MMA. The pH was corrected to 9.5 with AMP.

EXAMPLES 6 TO 10

By the method described for example 1, the polymer hybrid dispersions of examples 6 to 10 were prepared. The silicon oil and the amount thereof in the monomers are given in the following table. All products were obtained as low viscous (<100 mPas), white dispersions and were pH corrected to 8.5-9.5 using AMP. Residual monomer contents of these samples were found in the range of 30-170 ppm of MMA. The glass transition temperature of the polymer matrix was 105° C.

| Exp. # | Si-Oil | Ratio Si-oil/ M[1] | Si-Oil in product[2] [wt] | particle size [nm] | PD [%] | Solids [wt %] | RM [ppm] |
|---|---|---|---|---|---|---|---|
| 6 | 5 | 15/15 | 15 | 84 | 39% | 31.2 | 50 |
| 7 | 6 | 20/19 | 20 | 131 | 33% | 40.4 | 130 |
| 8 | 7 | 15/15 | 15 | 135 | 46% | 31.1 | 90 |
| 9 | 8 | 20/19 | 20 | 162 | 51% | 40.9 | 100 |
| 10 | 9 | 15/15 | 15 | 180 | 63% | 31.2 | 170 |

[1] weight ratio of silicon oil to monomers
[2] amount of silicon oil in final polymer hybrid dispersion in % by weight.
3) PD polydispersity of the particle size
4) RM: residual monomers (MMA) in the polymer hybrid dispersion

EXAMPLE 11

160 g of silicon oil 4 was dissolved in 36 g MMA, 3.2 g of SMA, 0.8 g of MAA and 0.12 g of BDDA. The oil phase was added dropwise to a stirred solution of 25.8 g of surfactant 1 in 163.4 g of deionised water. The mixture was stirred for 30 min treated with ultrasound using a Bandelin Sonoplus, Generator GM 2200, 200 W, 20 kHz, at 60% power for 20 minutes per 500 g of emulsion. A kinetically stable miniemulsion was obtained, wherein the average droplet size was 240 nm.

2.0 g of a 10 wt % aqueous solution of t-butyl hydroperoxide was added to the miniemulsion. The miniemulsion was heated to 40° C. To the reactor 8.3 g of a 4.8 wt % aqueous solution of Rongalit C was added at 40° C. within 1 hour. The reaction mixture was continuously stirred by a mechanical stirrer and was maintained at 60° C. for 1 hour, then cooled to 22° C. Then the pH of the obtained polymer dispersion was adjusted to 9.1 by addition of 0.5 g of AMP and the dispersion was filtered via a 200·m filter. The resulting dispersion had a particle size $D_{INT}$ of 191 nm with a polydispersity of 37%. The final active content (calculated as silicon oil 3) was 40 wt %, the solid content was 52.7 wt %. The residual monomer content (MMA) was 200 ppm. The aspect was a white, low viscous (<100 mPas) dispersion. The glass transition temperature of the polymer matrix was 105° C.

EXAMPLE 12

160 g of silicon oil 4 was dissolved in 12.8 g of MMA, 23.2 g of EHA, 3.2 g of SMA, 0.8 g of MAA and 0.12 g of BDDA. The oil phase was added dropwise to a stirred solution of 25.8 g of surfactant 1 in 163.4 g of deionised water. The mixture was stirred for 30 min treated with ultrasound using a Bandelin Sonoplus, Generator GM 2200, 200 W, 20 kHz, at 60% power for 20 minutes per 500 g of emulsion. A kinetically stable miniemulsion was obtained, wherein the average droplet size was 274 nm.

2.0 g of a 10 wt % aqueous solution of t-butyl hydroperoxide was added to the miniemulsion. The miniemulsion was heated to 40° C. To the reactor 8.3 g of a 4.8 wt % aqueous solution of Rongalit C was added at 40° C. within 1 hour. The reaction mixture was continuously stirred by a mechanical stirrer and was maintained at 60° C. for 1 hour, then cooled to 22° C. Then the pH of the obtained polymer dispersion was adjusted to 9.2 by addition of 1.2 g of AMP and the dispersion was filtered via a 200 μm filter. The resulting dispersoin had a particle size $D_{INT}$ of 199 nm with a polydispersity of 45%. The final active content (calculated as silicon oil 4) was 40 wt %, the solid content was 53 wt %. The residual monomer content (MMA) was <10 ppm.

The aspect was a white, low viscous (<100 mPas) dispersion. The glass transition temperature of the polymer matrix was 0° C.

EXAMPLE 13

The polymer hybrid dispersion was prepared by analogy to Example 11 but using 160 g of silicon oil 8 instead of 160 g of silicon oil 4. The final dispersion had a particle size of 503 nm and a solid content of 52.7%. The aspect was a white, low viscous (200 mPas) dispersion. The glass transition temperature of the polymer matrix was 105° C.

EXAMPLE 14

The polymer hybrid dispersion was prepared by analogy to Example 11 but using 160 g of silicon oil 5 instead of 160 g of silicon oil 4. The final dispersion had a particle size of 143 nm (dispersity 39%) and a solid content of 52.2%. The aspect was a white, low viscous (<100 mPas) dispersion with a residual MMA content of 50 ppm. The glass transition temperature of the polymer matrix was 105° C.

EXAMPLE 15

88.25 g of silicon oil 4 was dissolved in 86.5 g of MMA and 1.77 g of methacrylic acid MAA. The oil phase was added dropwise to a stirred solution of 22.8 g of a solution of surfactant 1 in 130 g of deionised water. . The mixture was stirred for 30 min treated with ultrasound using a Bandelin Sonoplus, Generator GM 2200, 200 W, 20 kHz, at 60% power for 20 minutes per 500 g of emulsion. A kinetically stable miniemulsion was obtained, wherein the average droplet size was 150 nm.

4.4 g of a 10 wt % aqueous solution of t-butyl hydroperoxide was added to the miniemulsion. The miniemulsion was heated to 40° C. To the reactor 18.4 g of a 4.8 wt % aqueous solution of Rongalit C in water was added at 40° C. within 1 hour. The reaction mixture was continuously stirred by a mechanical stirrer and was maintained at 60° C. for 1 hour, then cooled to 22° C. Then the pH of the obtained polymer dispersion was adjusted to 9.1 by addition of 0.48 g of AMP and the dispersion was filtered via a 200 µm filter. The resulting dispersoin had a particle size $D_{INT}$ of 112 nm with a polydispersity of 36%. The final active content (calculated as silicon oil 4) was 25 wt %, the solid content was 52.1 wt %. The residual monomer content (MMA) was 50 ppm. The aspect was a white, slightly viscous (<500 mPas) dispersion.

COMPARATIVE EXAMPLES C1 TO C3, NOT ACCORDING TO THE INVENTION

Comparative Example C1

In a 500 ml beaker, 123.3 g of silicon oil 4 were heated to 60° C. and 18.5 g surfactant 2 was added and homogenized. Under vigorous stirring, 248.2 g of water were added to form an emulsion, which was brought to pH 11 by addition of 0.48 g of AMP. After stirring for 30 min and ultrasound treatment a miniemulsion of an average droplet size of 150 nm was obtained. After storage of 24 h at 22° C., the emulsion separated into an aqueous and a silicone layer.

Comparative Example C2

In a 500 ml beaker, 123.3 g of silicon oil 4 were heated to 60° C., and 60 g of surfactant 1 were added and homogenized. Under vigorous stirring, 207.1 g of water were added to form an emulsion, which was brought to pH 11 by addition of 2.57 g of AMP. After stirring for 30 min and subsequent ultrasound treatment a miniemulsion was obtained, which separated into two phases within a few hours.

Comparative Example C3

288 g of MMA, 25.6 g of SMA, 6.4 g of MAA and 0.96 g of BDDA were mixed and added to a stirred solution of 42.3 g of surfactant 1 in 1231 g of deionised water. After stirring for 30 min and subsequent homogenization with a APV Gaulin high pressure homogenizer at 600 bar a kinetically stable miniemulsion was obtained wherein the average droplet size was 105 nm.

18.2 g of a 10 wt % solution of t-butyl hydroperoxide in water was added to the miniemulsion and the emulsion was heated to 40° C. To the miniemulsion 48.2 g of a 7 wt % aqueous solution of Rongalit C solution was added at 40° C. within 1 hour. The reaction mixture was continuously stirred by a mechanical stirrer and was maintained at 60° C. for 1 hour, then cooled to 22° C. Then the pH was adjusted to 8.2 by addition of 1.90 g of AMP and the dispersion was filtered via a 200 µm filter. The resulting dispersion had a particle size $D_{INT}$ of 49 nm with a polydispersity of 38%. The solid content was 19.8 wt %. The aspect was a translucent white, low viscous (<25 mPas) dispersion.

Testing in a Clear, Waterborne Wood Coating

The synthetic examples were formulated as hybrid additives into a water-borne, acrylic clear coat for water borne wood applications. The addition level of the polysiloxane active ingredient was calculated to be 0.67% and 6.7% in the dry film. No additional additives were added in order to observe the effects of the silicone-acrylate hybrid additive. As a reference, the same formulation without the addition of the hybrid additive was used (control formulation) as well as a water-emulsifiable polyether modified PDMS (EFKA® 3299, 100% active) was added at the same active silicone level as used with the hydrid additives of the invention.

Paint Formulation I Containing a 20 wt % Silicone-Polymer Hybrid Dispersion for 0.67% Silicone Oil in Final Dry Film:

| | |
|---|---|
| Neocryl ® XK 90 (from DSM), 45% solids in water | 97.42 parts |
| EFKA ® 3570 (BASF, substrate wetter), 60% active in water | 1.12 parts |
| Silicone Polymer hybrid dispersion 20% active (calc. as silicon oil) | 1.46 parts |
| Total: | 100.0 parts |

Paint Formulation II Containing a 20 wt % Silicone-Polymer Hybrid Dispersion for 6.7% Silicone Oil in Final Dry Film:

| | |
|---|---|
| Neocryl ® XK 90 (from DSM), 45% solids in water | 86.00 parts |
| EFKA ® 3570 (BASF, substrate wetter), 60% active in water | 1.08 parts |
| Silicone Polymer hybrid dispersion 20% active (calc. as silicon oil) | 12.92 parts |
| Total: | 100.0 parts |

Paint Formulation III Containing a 40 wt % Silicone-Polymer Hybrid Dispersion for 0.67% Silicone Oil in Final Dry Film:

| | |
|---|---|
| Neocryl ® XK 90 (from DSM), 45% solids in water | 98.81 parts |
| EFKA ® 3570 (BASF, substrate wetter), 60% active in water | 1.12 parts |
| Silicone Polymer hybrid dispersion 20% active (calc. as silicon oil) | 0.07 parts |
| Total: | 100.0 parts |

Paint Formulation IV Containing a 40 wt % Silicone-Polymer Hybrid Dispersion for 6.7% Silicone Oil in Final Dry Film:

| | |
|---|---|
| Neocryl ® XK 90 (from DSM), 45% solids in water | 92.02 parts |
| EFKA ® 3570 (BASF, substrate wetter), 60% active in water | 1.08 parts |
| Silicone Polymer hybrid dispersion 20% active (calc. as silicon oil) | 6.9 parts |
| Total: | 100.0 parts |

The wet paint was applied to a polyester substrate with a bar coater (75 μ) and left drying for at least 24 h at room temperature. After this period, the films were assessed visually on surface quality (craters), substrate wetting, and film clarity (haze).

TABLE 2

Film quality of coating with encapsulated silicone oils against control and benchmarks at 0.67% addition level based on dry film

| Example | AL | Tg Matrix ° C. | Surface quality | Surface wetting | Film clarity (haze) |
|---|---|---|---|---|---|
| Control | 0% | — | rough | OK | Clear |
| C3 | 0% | 105 | rough | OK | Clear |
| silicon oil 10 | 100% | — | smooth residual foam | OK | Clear |
| silicon oil 4 | 100% | — | Craters | irregular | Turbid |
| Ex. 6 | 15% | 105 | Smooth | OK | Clear |
| Ex. 3 | 20% | 105 | Smooth | OK | Clear |
| Ex. 7 | 20% | 105 | Smooth | OK | Clear |
| Ex. 8 | 15% | 105 | Smooth | OK | slightly turbid |
| Ex. 9 | 20% | 105 | Smooth | OK | slightly turbid |
| Ex. 10 | 15% | 105 | Smooth | OK | slightly turbid |
| Ex. 4 | 20% | 0 | Smooth | OK | Clear |
| Ex. 11 | 40% | 105 | Smooth | OK | Clear |
| Ex. 12 | 40% | 0 | Smooth | OK | Clear |
| Ex. 13 | 40% | 105 | Smooth | OK | slightly turbid |
| Ex. 14 | 40% | 105 | Smooth | OK | Clear |

The surface smoothness was measured using a dynamometer (Labthink Instruments Co Ltd) via the Horizontal Dynamometer Pull-Meter Method, ASTM C-1028-96. In this test the coefficient of friction (COF) between the test film and a defined counterweight is measured, and describes the ease with which two surfaces slide in contact with each other. The lower the COF the better the slip. Of special value is the dynamic COF which corresponds to the forces required to keep the sled in a defined motion, without interference of possible surface defects.

TABLE 3

Coefficient of friction (COF) measurement of encapsulated silicone samples against control and benchmarks

| Sample | AL[1] | $T_g$ Matrix [° C.] | COF-DYN use level 0.67%/dry film | COF-DYN use level 6.7%/dry film |
|---|---|---|---|---|
| Control | 0% | — | 0.42 | |
| silicon oil 10 | 100% | — | 0.29 | 0.22 |
| silicon oil 4 | 100% | — | 0.24 | n.d.[2] |
| Ex. 6 | 15% | 105 | 0.27 | 0.28 |
| Ex. 3 | 20% | 105 | 0.31 | 0.26 |
| Ex. 7 | 20% | 105 | 0.33 | 0.24 |
| Ex. 8 | 15% | 105 | 0.31 | 0.27 |
| Ex. 9 | 20% | 105 | 0.22 | 0.21 |
| Ex. 10 | 15% | 105 | 0.27 | 0.17 |
| Ex. 4 | 20% | 0 | 0.28 | 0.16 |
| Ex. 11 | 40% | 105 | 0.31 | n.d |
| Ex. 12 | 40% | 0 | 0.36 | n.d |
| Ex. 13 | 40% | 105 | 0.19 | n.d |
| Ex. 14 | 40% | 105 | 0.29 | n.d |

[1] Amount of silicon oil in polymer hybrid dispersion
[2] n.d.: not determined

The above results demonstrate that the inventive silicone polymer hybrid dispersion can be well incorporated to aqueous paints formulations without incompatibility problems, i.e. the resulting paints are storage stable. Also in the resulting coatings, the inventive silicone-acrylate hybride additives provide very useful surface effects: they effectively prevent defects in the paint film like craters and they provide a good slip effect, which is visible especially by a low dynamic coefficient of friction.

Also the paint films containing the inventive silicone polymer hybrid dispersion show higher water contact angles (range 80 to 100°) which demonstrates in addition the surface hydrophobizing effect of these additives. It can be seen that polymer dispersions of comparative example 5 must be used in higher amounts than the polymer dispersions of examples 2 and 3.

TABLE 4 contact angle measurement (sessile drop of demineralized water) of dry paint surfaces.

| Sample | silicon oil in sample [wt %] | amount of silicon oil per binder polymer [wt %] | Contact angle with water on surface |
|---|---|---|---|
| Control | 0% | 0% | 65° |
| C3 | 0% | 0% | 69° |
| Ex. 2 | 20% | 1% | 96° |
| Ex. 2 | 20% | 3% | 92° |
| Ex. 3 | 20% | 1% | 93° |
| Ex. 5 | 20% | 1% | 83° |
| Ex. 5 | 20% | 3% | 91° |
| Ex. 5 | 20% | 10% | 93° |

The invention claimed is:

1. An aqueous polymer-silicon oil hybrid composition, comprising:
   an aqueous dispersion comprising water and finely divided polymer-silicon oil hybrid particles which comprise
   at least one waster-insoluble polymer P made of an ethylenically unsaturated monomer M,
   at least one surface-active substance, and
   at least one non-polymerizable, non-polar silicon oil having at least one poly(dimethylsilyloxy)-group and not comprising C=C double bonds, wherein the silicon oil is present in the polymer particles in an amount of 0.15 to 2 parts by weight, per 1 part by weight of polymer P, wherein the monomer M comprises at least 90% by weight of at least one monoethylenically unsaturated monomer M1 having a water-solubility of at most 50 g/L at 20° C.

2. The composition of claim 1, wherein the monomer M1 comprises at least 80% by weight, based on the total amount of the constituent monomer M of the polymer P, of one or more monomers M1a which are selected from the group consisting of esters of monoethylenically unsaturated $C_3$-$C_6$ monocarboxylic acids with $C_1$-$C_{10}$ alkanols, $C_5$-$C_8$ cycloalkanols, phenyl-$C_1$-$C_2$ alkanols or phenoxy-$C_1$-$C_2$ alkanols, the diesters of monoethylenically unsaturated $C_4$-$C_6$ dicarboxylic acids with $C_1$-$C_{10}$ alkanols, $C_5$-$C_8$ cycloalkanols, phenyl-$C_1$-$C_4$ alkanols or phenoxy-$C_1$-$C_4$-alkanols, vinylaromatic hydrocarbons having from 6 to 10 carbon atoms, and mixtures of these monomers, and up to 20% by weight, based on the total amount of the constituent monomer M of the polymer P, of at least one monoethylenically unsaturated monomer M1b which have at least one saturated $C_{11}$-$C_{30}$ hydrocarbon radical or a $C_4$-$C_{20}$-alkyl phenyl radical.

3. The composition of claim 2, wherein the monomer M1 comprises the at least one monoethylenically unsaturated monomer M1b and the at least one monoethylenically unsaturated monomer M1b is selected from the group consisting of $C_{11}$-$C_{24}$ alkyl acrylates, $C_{11}$-$C_{24}$ alkyl methacrylates, and mixtures thereof.

4. The composition of claim 2, wherein the at least one monoethylenically unsaturated monomer M1a is selected from the group consisting of $C_1$-$C_{10}$ alkyl acrylates, $C_1$-$C_{10}$ alkyl methacrylates, styrene, and mixtures thereof.

5. The composition of claim 1, the monomer M comprises 80% to 99.9% by weight, based on the total amount of the monomer M, of at least one monomer M1a selected from the group consisting of esters of monoethylenically unsaturated $C_3$-$C_6$ monocarboxylic acids with $C_1$-$C_{10}$ alkanols, $C_5$-$C_8$ cycloalkanols, phenyl-$C_1$-$C_2$ alkanols or phenoxy-$C_1$-$C_2$ alkanols, the diesters of monoethylenically unsaturated $C_4$-$C_6$ dicarboxylic acids with $C_1$-$C_{10}$ alkanols, $C_5$-$C_8$ cycloalkanols, phenyl-$C_1$-$C_4$ alkanols or phenoxy-$C_1$-$C_4$-alkanols, vinylaromatic hydrocarbons having from 6 to 10 carbon atoms, and mixtures of these monomers, and 0.1% to 20%, based on the total amount of the monomer M, of at least one further monomer different from monomer M1a, which is selected from the group consisting of 0.1% to 20% by weight, based on the total amount of monomer M, of at least one monomer M1b which have at least one saturated $C_{11}$-$C_{30}$ hydrocarbon radical or a $C_4$-$C_{20}$-alkyl phenyl radical, and 0.1% to 10% by weight, based on the total amount of monomer M, of one or more ethylenically unsaturated monomers M2, which are different, from the monomer M1a and M1b.

6. The composition of claim 5, wherein the monomers M2 are selected from:

0.01% to 5% by weight, based on the total amount of the monomer M, of monomer M2a which has at least two non-conjugated ethylenically unsaturated double bonds;

0.1% to 10% by weight, based on the total amount of the monomer M, of monoethylenically unsaturated monomer M2b having at least one acidic group; and 0.1% to 10% by weight, based on the total amount of the monomer M, of monoethylenically unsaturated neutral monomer M2c having a solubility in water at 25° C. of at least 100g/l.

7. The composition of claim 6, wherein the monomer M comprises 0.1% to 10% by weight, based on the total amount of the monomer M, of at least one monomer selected from the group consisting of the monoethylenically unsaturated monomers M2b and the monoethylenically unsaturated neutral monomers M2c.

8. The composition of claim 1, wherein the non-polymerizable, non-polar silicon oil is a polydimethylsiloxane containing at least 90% by weight of dimethylsilyloxy groups, based on the total weight of the silicon oil.

9. The composition of claim 1, wherein the non-polarizable, non-polar silicon oil has a weight average molecular weight (Mw) in the range of 800 to 1000000 g/mol.

10. The composition of claim 1, wherein the surface-active substance is a surfactant, wherein the total amount of the polymer P and the non-polymerizable, non-polar silicon oil is from 10 to 60% by weight, based on the total weight of the composition, wherein the total amount of the surfactant is from 0.1 to 10% by weight, based on the total weight of the composition, and wherein the amount of the water is from 39.9 to 89.9% by weight, based on the total weight of the composition.

11. The composition of claim 1, in which the weight ratio of the non-polymerizable silicon oil to the polymer P is in the range from 1:2 to 1.5:1.

12. The composition of claim 1, wherein the non-polymerizable non-polar silicon oil is a mixture of at least two silicon oils having different average molecular weights.

13. The composition of claim 1, wherein the polymer P has a glass transition temperature, determined by dynamic scanning calorimetry (DSC) in accordance with ASTM-D 2418/82, of at least 0° C.

14. The composition of claim 1, wherein the polymer-silicon oil hybrid particles have an average particle diameter, determined by dynamic light scattering of less than 1000 nm.

15. The aqueous composition of claim 1, wherein the non-polymerizable, non-polar silicon oil having at least one poly(dimehylsilyloxy)-group and comprising no C=C double bonds is selected from the group consisting of:

a linear or Si-branched polysiloxane consisting of dimethylsilyloxy groups and terminal trimethylsilyloxy groups;

an α,ω-terminated polydimethylsiloxane, which is a linear or Si-branched polysiloxane having terminal $C_2$-$C_{30}$-alkyl groups, which are interrupted by at least one functional moiety selected from —O—, —OC=O— or —NHC=O—, or terminal $C_1$-$C_{10}$-alkoxy groups;

a polysiloxane of formula (I):

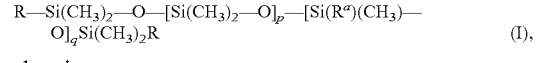

wherein:

q is an integer from 1 to 500 and p is and an integer from 0 to 500 with the proviso that p+q is at least 2;

R is $CH_3$, $C_2$-$C_{22}$ alkyl, halogenated $C_1$-$C_{22}$ alkyl, $C_5$-$C_{22}$ cycloalkyl, or an aromatic hydrocarbon radical having 6 to 22 carbon atoms; and $R^a$ is $C_2$-$C_{22}$ alkyl, halogenated $C_1$-$C_{22}$ alkyl, $C_5$-$C_{22}$ cycloalkyl, an aromatic hydrocarbon radical having 6 to 22 carbons, or —[Si($CH_3$)$_2$—O]$_n$—[Si($R^b$)($CH_3$)—O]$_m$Si($CH_3$)$_2$ R, wherein n and m are each independently an integer from 1 to 100 with the proviso that n+m is at least 1, R is the same as defined in formula (I), and $R^b$ is a radical selected from $C_2$-$C_{22}$ alkyl, halogenated $C_1$-$C_{22}$ alkyl, $C_5$-$C_{22}$ cycloalkyl and an aromatic hydrocarbon radical having 6 to 22 carbons;

a polysiloxanes of the formula (II):

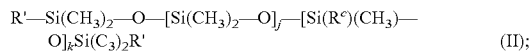

(II);

wherein:

k is an integer from 1 to 500 and j is and an integer from 0 to 500 with the proviso that j+k is at least 2;

R' is $CH_3$, halogenated $C_1$-$C_{22}$ alkyl, or a $C_2$-$C_{30}$-alkyl group, which is interrupted by at least one functional moiety selected from —O—, —OC=O— or —NHC=O—, and $R^c$ is a $C_2$-$C_{30}$-alkyl group, which is interrupted by at least one functional moiety selected from —O—, —OC=O— or —NHC=O—, or —[Si($CH_3$)$_2$—O]$_n$—[Si($R^d$)($CH_3$)—O]$_m$Si($CH_3$)$_2$R', wherein n and m are each independently an integer from 1 to 100 with the proviso that n+m is at least 1, R' is the same as defined in formula (II), and $R^d$ is a $C_2$-$C_{30}$-alkyl group, which is interrupted by at least one functional moiety selected from —O—, —OC=O— or —NHC=O—.

16. A process for preparing an aqueous polymer-silicon oil hybrid composition of claim 1, which comprises:

polymerizing an aqueous oil-in water emulsion by radical emulsion polymerization in the presence of at least one surface-active substance, which is a surfactant, wherein the oil phase of the emulsion is a solution of the non-polymerizable, non-polar silicon oil having at least one poly(dimethylsilyloxy)-group and not comprising C=C double bonds in the ethylenically unsaturated monomer M forming the polymer P, wherein a concentration of the non-polymerizable silicon oil is at least 15%, by weight, based on the amount of monomer M.

17. The process of claim 16, wherein the average droplet size of the oil phase in the aqueous oil-in water emulsion, determined by dynamic light scattering, is less than 1000 nm.

18. The process of claim 16, comprising:
i. dissolving the non-polymerizable silicon oil in the ethylenically unsaturated monomer M;
ii. emulsifying the solution of the non-polymerizable silicon oil obtained in step i. in water containing the at least one surfactant, whereby a conventional oil-in-water emulsion is obtained;
iii. comminuting the droplet size of the conventional oil-in-water emulsion of step ii. to obtain an aqueous oil-in water emulsion having an average droplet size, determined by dynamic light scattering, of below 1000 nm; and
iv. initiating free-radical polymerization in the aqueous oil-in water emulsion of step iii.

19. An additive for a polymer based aqueous coating composition or printing ink composition, said additive comprising:
the aqueous polymer-silicon oil hybrid composition as defined in claim 1.

20. A method for modifying the properties of a coating or ink, comprising:
adding the additive of claim 19 to said coating or ink, thereby:
reducing the static or dynamic friction of the coating or ink; and/or
increasing the anti-blocking properties of the coating or ink; and/or
increasing stain resistance of the coating or ink; and/or
imparting anti-graffity properties to a coating or ink; and/or
imparting hydrophobic properties or water-repellency to the coating or ink.

21. An aqueous coating composition or printing ink composition, comprising:
at least one binder polymer P' in the form of finely dispersed polymer particles; and
at least one aqueous polymer-silicon oil hybrid composition as defined in claim 1.

22. The aqueous composition of claim 21, containing the at least one aqueous polymer-silicon oil hybrid composition in such an amount that the amount of the non-polymerizable silicon oil is from 0.1 to 10% by weight, based on the amount of binder polymer P'.

* * * * *

UNITED STATES PATENT AND TRADEMARK OFFICE
CERTIFICATE OF CORRECTION

PATENT NO. : 10,584,263 B2
APPLICATION NO. : 15/513462
DATED : March 10, 2020
INVENTOR(S) : Frank Pirrung et al.

Page 1 of 3

It is certified that error appears in the above-identified patent and that said Letters Patent is hereby corrected as shown below:

On the Title Page

Column 2, item (56), Other Publications, Line 4, "PCT/ EP2015" should read -- PCT/EP2015 --.

In the Specification

Column 1, Line 42, "trimetylsilyloxy" should read -- trimethylsilyloxy --.

Column 3, Line 33, "graffity" should read -- graffiti --.

Column 4, Line 51, "$C_3$-$C_6$" should read -- $C_4$-$C_6$ --.

Column 4, Line 52, "$C_3$-$C_6$" should read -- $C_1$-$C_{30}$ --.

Column 5, Line 41, "$C_2$alkanols" should read -- $C_2$ alkanols --.

Column 6, Lines 8-9, "methacrylatem" should read -- methacrylate --.

Column 7, Line 41, "100 g/l;" should read -- 100 g/l. --.

Column 9, Line 17, "acid." should read -- acid, --.

Column 10, Line 65, "$C_{24}$alkyl" should read -- $C_{24}$ alkyl --.

Column 13, Line 4, "CHs" should read -- $CH_3$ --.

Column 16, Line 37, "$D_{50}$" should read -- $D_{90}$ --.

Column 17, Line 57, "polymerisable" should read -- polymerizable --.

Signed and Sealed this
Fifteenth Day of September, 2020

Andrei Iancu
*Director of the United States Patent and Trademark Office*

Column 19, Line 51, "of the of the" should read -- of the --.

Column 19, Line 55, "droplest" should read -- droplet --.

Column 19, Line 58, "of the of the" should read -- of the --.

Column 20, Line 62, "Jeffamines®" should read -- Jeffamine® --.

Column 21, Line 61, "graffity" should read -- graffiti --.

Column 22, Line 4, "polymerisation" should read -- polymerization --.

Column 22, Line 31, "polymerisation" should read -- polymerization --.

Column 23, Line 3, "M1b,;" should read -- M1b; --.

Column 23, Line 34, "e.g" should read -- e.g. --.

Column 25, Line 34, "Visosities" should read -- Viscosities --.

Column 25, Line 37, "Glastransition" should read -- Glasstransition --.

Column 25, Line 48, "trifluormethansulfonic" should read -- trifluoromethanesulfonic --.

Column 26, Line 35, "Sonoplus" should read -- Sonopuls --.

Column 26, Line 61, "Sonoplus" should read -- Sonopuls --.

Column 28, Line 10, "1)" should read -- 1) --.

Column 28, Line 10, "monomers" should read -- monomers. --.

Column 28, Line 11, "2)" should read -- 2) --.

Column 28, Line 12, "size" should read -- size. --.

Column 28, Line 13, "dispersion" should read -- dispersion. --.

Column 28, Line 22, "Sonoplus" should read -- Sonopuls --.

Column 28, Line 35, "200·m" should read -- 200 µm --.

Column 28, Line 51, "Sonoplus" should read -- Sonopuls --.

Column 28, Line 64, "dispersoin" should read -- dispersion --.

CERTIFICATE OF CORRECTION (continued)
U.S. Pat. No. 10,584,263 B2

Column 29, Line 28, "water. ." should read -- water. --.

Column 29, Line 30, "Sonoplus" should read -- Sonopuls --.

Column 29, Line 43, "dispersoin" should read -- dispersion --.

Column 30, Line 42, "hydrid" should read -- hybrid --.

Column 32, Line 20, "$^{1)}$" should read -- 1) --.

Column 32, Line 21, "$^{2)}$" should read -- 2) --.

Column 32, Line 24, "hybride" should read -- hybrid --.

Column 32, Line 27, "hybride" should read -- hybrid --.

Column 32, Line 33, "hybride" should read -- hybrid --.

In the Claims

Column 32, Line 62, Claim 1, "waster" should read -- water --.

Column 33, Line 43, Claim 5, "C $_{10}$" should read -- $C_{10}$ --.

Column 33, Line 60, Claim 5, "different," should read -- different --.

Column 34, Line 21, Claim 9, "Mw" should read -- $M_w$ --.

Column 34, Line 50, Claim 15, "dimehylsilyloxy" should read -- dimethylsilyloxy --.

Column 35, Line 7, Claim 15, "(CH$_3$)$_2$ R" should read -- (CH$_3$)$_2$R --.

Column 35, Line 17, Claim 15, "C$_3$" should read -- CH$_3$ --.

Column 35, Line 46, Claim 16, "polyrnerizable" should read -- polymerizable --.

Column 36, Line 32, Claim 20, "graffity" should read -- graffiti --.